US012800115B2

(12) United States Patent
Sudhakar et al.

(10) Patent No.: US 12,800,115 B2
(45) Date of Patent: Nov. 17, 2026

(54) GAS PIPELINE PATHWAY ANALYSIS, CONTROL AND COMMUNICATION

(71) Applicant: FLORIDA POWER & LIGHT COMPANY, Juno Beach, FL (US)

(72) Inventors: Rahul Sudhakar, Jupiter, FL (US); Richard E. Kaufman, West Palm Beach, FL (US); Lisa F Gorman, Palm Beach Gardens, FL (US); Max R Macon, Jupiter, FL (US); Manuel P. Acosta, Wellington, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 210 days.

(21) Appl. No.: 18/924,927

(22) Filed: Oct. 23, 2024

(65) Prior Publication Data

US 2026/0110405 A1 Apr. 23, 2026

(51) Int. Cl.
*F17D 3/01* (2006.01)
*F17D 5/00* (2006.01)

(52) U.S. Cl.
CPC ............... *F17D 3/01* (2013.01); *F17D 5/005* (2013.01)

(58) Field of Classification Search
CPC .................................. F17D 3/01; F17D 5/005
USPC .......................................................... 700/282
See application file for complete search history.

(56) References Cited

U.S. PATENT DOCUMENTS

2002/0042700 A1* 4/2002 Giles ...................... G06Q 10/06 703/6
2006/0009881 A1* 1/2006 Ferber .................. G05D 7/0647 700/282
2008/0228518 A1 9/2008 Braziel
2014/0310049 A1 10/2014 Goel
2020/0380512 A1* 12/2020 Witkowski ............ H04L 9/0827

FOREIGN PATENT DOCUMENTS

CA 3154749 A1 10/2023
CN 117010660 A 11/2023
CN 113326984 B 2/2024

OTHER PUBLICATIONS

Panariso, Jenn; "The Complete Guide to Streamlining Natural Gas Scheduling"; <https://www.pcienergysolutions.com/2023/10/03/the-complete-guide-to-streamlining-natural-gas-scheduling/>; Oct. 3, 2023; pp. 1-14.

* cited by examiner

*Primary Examiner* — Jigneshkumar C Patel
(74) *Attorney, Agent, or Firm* — Troutman Pepper Locke LLP; Dustin B. Weeks

(57) ABSTRACT

Some embodiments provide systems and methods for gas pipeline pathway analysis, control and communication. In some embodiments, a physical pipeline scheduling and control system comprises a server or computer-based computing system configured to receive a user input corresponding to a request for a gaseous resource, automatically obtain data from a plurality of data sources, automatically simulate a plurality of potential pathways of the gas pipeline network, automatically output a pathway recommendation comprising at least a first recommended pathway, receive a user selection of a selected recommended pathway, automatically format a nomination for the selected recommended pathway, and automatically access and control a separate electronic submission system and electronically submit the nomination for the request for the gaseous resource to the electronic submission system for execution.

20 Claims, 8 Drawing Sheets

GAS PIPELINE PATHWAY ANALYSIS, CONTROL AND COMMUNICATION

TECHNICAL FIELD

This invention relates generally to systems to analyze and control pipeline pathways.

BACKGROUND

Gas is often transported to an intended consumer through one or more pipelines of one or more gas transmission pipeline networks. The use of the pipelines is typically based on the advance scheduling of a gas pipeline transfer through a determined pipeline pathway. The selection of a determined pipeline pathway from numerous pipeline pathway options for gas transfer is difficult, time intensive, and uncertain due to many dynamic variables. If the selected pipeline pathway has not been carefully considered among the many available pipeline pathway choices, a gas customer may overpay for a given gas transfer. And if the selected pipeline pathway cannot provide the desired gas volume when needed, a gas customer may be forced to obtain gas from another source in a real-time market at a higher rate.

BRIEF DESCRIPTION OF DRAWINGS

Disclosed herein are embodiments of systems, apparatuses and methods pertaining to cloud server and computer systems to analyze and manage physical pipeline networks. This description includes drawings, wherein.

Figure 1:
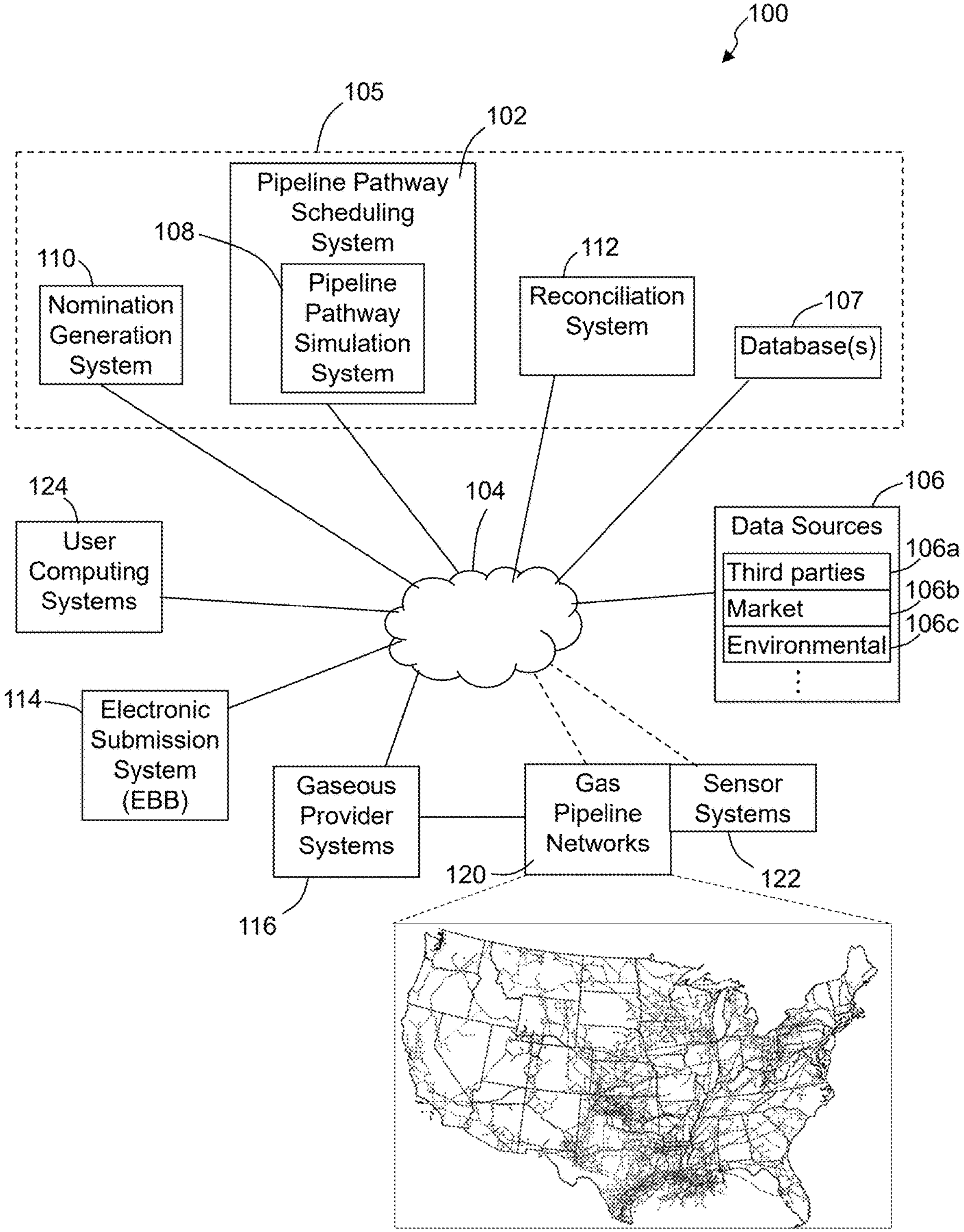
FIG. 1 illustrates a simplified block diagram of an exemplary automated pipeline structure pathway scheduling and control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to “one embodiment,” “an embodiment,” “some embodiments”, “an implementation”, “some implementations”, “some applications”, or similar language means that a particular feature, structure, or characteristic described in connection with the embodiment is included in at least one embodiment of the present invention. Thus, appearances of the phrases “in one embodiment,” “in an embodiment,” “in some embodiments”, “in some implementations”, and similar language throughout this specification may, but do not necessarily, all refer to the same embodiment.

Gaseous resources, such as natural gas ($CH_4$, or methane), hydrogen ($H_2$), etc., are consumed by many different types of consumer entities, e.g., to provide gas-based power. The supply of such gaseous resources is extremely complex due in part to the number of parties involved in the effective and efficient distribution of gaseous resources between numerous different gaseous resource providers and numerous different requesting consumers or entities. In many instances, gaseous resources are distributed through one or more physical pipeline networks that extend and fluidly couple gaseous resource providers to the numerous different potential consumer entities at different terminal nodes or connections. The pipeline networks include geographically distributed pipelines, sometimes referred to as edges, which extend between different geographically distributed connections, sometimes referred to as nodes, where the flow of the gaseous resource or resources can be controlled and/or monitored. Typically, multiple different third-party entities own and/or control different portions of the pipeline network. Accordingly, in controlling the flow of gaseous resources in some cases, not only does the scheduling need to acquire the intended amount of gaseous resource from one or more resource providers over an intended duration, but one or more pipeline pathways or routes need to be selected and transport allocations from several different third party pipeline entities need to be secured and scheduled for the one or more intended pipeline pathways. In some embodiments, this scheduling is performed in advance of an intended time of delivery in order to establish desired allocations of resources (e.g., supply, pipeline pathways, etc.). Often such scheduling can be performed a day or more in advance. However, conditions can change rapidly, and as such real-time updated reevaluations typically need to be performed in short amounts of time (e.g., hours or even minutes) to account for real-time changes. Some embodiments provide an automated pipeline scheduling and control system that enables optimized scheduling and control of pipeline networks in controlling the distribution of the gaseous resources between resource providers and consumer entities. Further, the pipeline simulation enables the identification of numerous different potential pipeline pathways that could not otherwise be identified through the application of rules and algorithms that are executed by human operators. Additionally, through the automated simulation, the system is capable of processing tremendous amounts of data that otherwise could not be fully evaluated by users, while further enabling real-time evaluations based on real-time changes that otherwise could not be fully considered by human operators.

FIG. 1 illustrates a simplified block diagram of an exemplary automated physical pipeline structure pathway scheduling and control system 100, in accordance with some embodiments. The automated pipeline scheduling and control system 100 can include one or more physical structure pathway analysis, control, and communication systems 105 that comprise one or more pipeline pathway scheduling systems 102 that are communicatively coupled, via one or more distributed communications and/or computer networks 104, and cooperatively operate to analyze physical pipeline structure pathways. In some embodiments, the pipeline pathway scheduling systems 102 can be implemented through one or more cloud server systems that can each be implemented through one or more network and/or Internet servers that are geographically distributed and cooperatively operated to process in real-time pipeline network information to in part optimize physical structure pipeline scheduling and control of networks of physical pipelines through the communications of negotiations through one or more communication protocols utilized by electronic submission systems 114. Alternatively or additionally, the pipeline pathway scheduling systems 102, in some embodiments, can be implemented in part or in full through one or more computers, laptops and/or other such computing systems executing one or more applications to implement structure pipeline analysis and pathway scheduling. In some embodiments, the pipeline pathway scheduling systems 102 are further communicatively coupled via the distributed communications network with numerous different networked data sources 106 that maintain and typically rapidly update over time different types of information relevant to the acquisition, transfer and/or utilization of one or more different gaseous resources, sometimes simply referred to below as gas. Some examples of such data sources 106 can include, but are not limited to, third party gas entities **106*a* (e.g., third party gaseous providers, third party gas pipeline entities that own and/or operate one or more portions of one or more physical pipeline structure networks and/or pathways, third party gaseous retailers, commodity traders, shippers, third party gas brokers, etc.), market and/or economic information sources 106*b* (e.g., providing information about gas pricing, gas demand, gas availability, etc.), weather and/or other such environmental data sources 106*c*, other sources of information, and typically a combination of two or more of such sources 106** of information.

The physical structure pathway analysis, control and communication systems 105 greatly improve the control of physical gas pipeline networks and physical structure pathway analysis and communications technologies in a way that cannot be performed by human operators with more consistent and reliable results. By applying predefined sets of specific rules and specific threshold evaluations, the pathway analysis, control and communication systems 105 in part improve pathway scheduling in a way that previously could not be consistently implemented. Human biases can alter and/or adversely affect the analysis and pathway selections often resulting in less than optimal pathway selections. Similarly, previous analysis often failed to consider many factors based on assumptions, biases, a failure to access information, inaccurate information, and/or other issues that can result in reduced efficiency and less beneficial pathway selection. Alternatively, the pathway analysis control and communication systems 105 improve the physical pipeline structure analysis technology in part providing enhance reliability, consistency in pipeline scheduling, ensuring the control of accurate gaseous distribution, and other improvements. Some embodiments provide for distributed processing over the network to reduce computational demand at one location, improve processing speed, provide for redundancy to enhance reliability and ensure the control of accurate gaseous distribution, and other improvements.

In some embodiments, the pipeline pathway scheduling system 102 includes one or more pipeline pathway simulation systems 108. The pipeline pathway simulation systems 108 can be implemented, at least in part, through one or more simulation computers and/or cloud servers each comprising one or more control circuits comprising one or more processors and/or microprocessors having and/or accessing computer memory storing simulation code executed by the one or more simulation control circuits. For example, the simulation control circuits, in some embodiments, can be implemented through one or more computers, servers, cloud based computer systems and/or other such systems that are communicatively coupled over the one or more communications and/or computer networks 104, which may include one or more local area networks (LAN), one or more wide area networks (WAN), the Internet, one or more wireless networks (e.g., cellular, satellite, radio frequency, etc.), other such networks, or a combination of two or more of such networks. The pipeline pathway simulation systems 108, in some embodiments, execute one or more applications that operate with and/or are add-ons to one or more spreadsheet applications that can be run on a user's computer (e.g., operate in cooperation with MICROSOFT EXCEL™, GOOGLE SHEETS, or other spreadsheet application).

In some embodiments, the pathway analysis, control and communication system 105 can comprise or communicate with one or more nomination generation systems 110, one or more reconciliation systems 112, one or databases 107, one or more user computing systems 124 (e.g., computers, laptops, smartphones, tablets, servers, etc.), and/or other system components. Further, some or all of the pipeline pathway scheduling system(s) 102, the nomination generation system(s) 110, the reconciliation system(s) 112, and/or other system components can be implemented through one or more computers, servers, cloud-based computer systems and/or other such systems that are communicatively coupled over the one or more communications and/or computer networks 104. Other data and/or databases 107 can be included in, maintained by and/or accessed by components of the pipeline pathway scheduling system 102. In some embodiments, the pipeline pathway scheduling system 102 is communicatively coupled with and/or includes one or more gaseous provider systems 116, the one or more gas pipeline networks 120, sensor systems 122 of gas pipeline networks (e.g., pressure sensors, flow sensors, valve position sensors, leak sensors, etc.), and/or other systems that physically control and/or monitor the flows of gaseous resources. FIG. 1 illustrates a representation of gas pipeline networks 120 covering the continental United States, in accordance with some embodiments.

In some embodiments, the components of a given physical structure pathway analysis, control and communication system 105 can be implemented in one or more computing devices, such as computers and/or servers each having a respective control circuit. For example, in some embodiments, each of systems 102, 110, 112 and database 107 may be implemented on separate computers or servers. In other embodiments, more than one of the systems 102, 110, 112 and database 107 may be implemented on a computer or server. In other embodiments, all of systems 102, 110, 112 and database 107 are implemented on a single computer or server. In some embodiments, user computer systems 124 may be remote to the physical structure pathway analysis, control and communication system 105, e.g., if the system 105 is implemented on cloud or server system. In some embodiments, where the system 105 is implemented on a computer such as a user computer, the user computing systems 124 can comprise computers of others in communication with the user computer executing the system 105.

Figure 2:
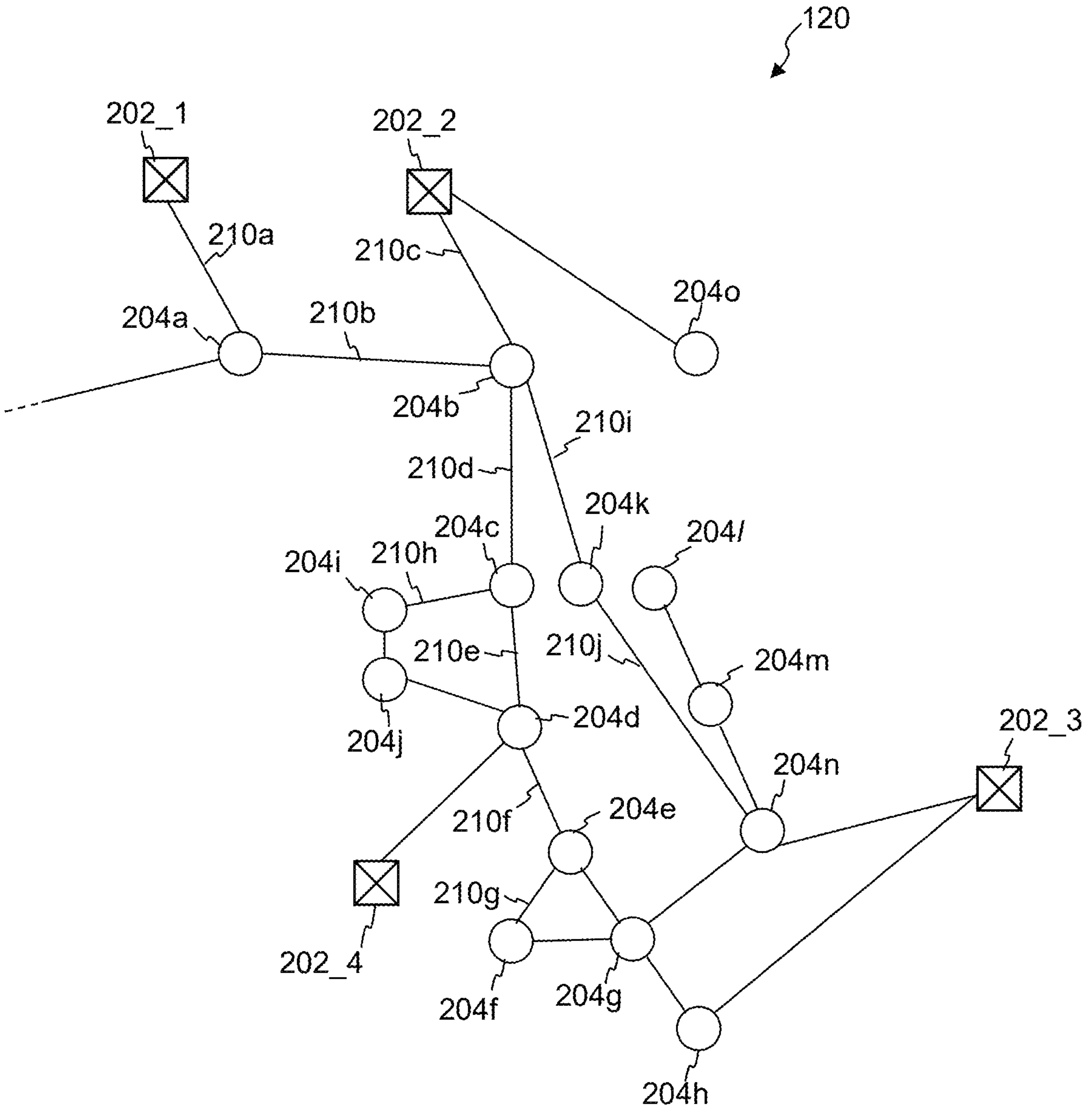
FIG. 2 illustrates a simplified block diagram representation of a portion of an exemplary pipeline network, in accordance with some embodiments.

FIG. 2 illustrates a simplified block diagram representation of a portion of an exemplary pipeline network 120, in accordance with some embodiments. The pipeline network 120 can, for example, include one or more and typically multiple gaseous resource providers 202 and/or sources, that each couple with multiple different connections 204 or nodes through one or more physical pipelines 210 or edges. In some embodiments, the resource providers 202 can similarly be considered connections through which a gas is injected into the pipeline network. The connections can include pipeline junction or transition points between different pipeline sections or sub-pipeline systems operated by different third party pipeline entities, meter stations, compression points, pumps, valves, diverters, and/or other components that physically control the movement and/or routing of gas through the different pipeline sections 210, monitor flow and/or other such aspects of a pipeline network. Similarly, the connections 204 can be termination points, such as gas consumer entities. While the pipeline sections 210 are illustrated by single lines, it will be appreciated that in some instances the pipeline sections 210 can include one or more physical pipelines between two points (e.g., between source providers 202 and connection 204 and/or between two connections 204 (e.g., 204*a*-204*b*)). Similarly, while the connections 204 are illustrated as single nodes, it will be appreciated that the connection can include two or more physical pipeline components that can cooperatively operate and/or individually operate.

Referring to FIGS. 1-2, in some embodiments, one or more simulation control circuits of the pipeline pathway simulation system 108 execute one or more applications and/or code stored on one or more non-transitory storage mediums and receive one or more user inputs corresponding to a request for a gaseous resource to be distributed through one or more gas pipeline networks 120 to a destination location, for example, destination location connection 204*f*. Typically, the request further specifies one or more destination times and/or desired times that the gas be received at the destination. As introduced above, the one or more gas pipeline networks 120 can comprise a network of pipeline sections 210, which can comprise one or more pipes, that interconnect connections 204 that are typically geographically distributed over wide geographic areas (e.g., often across tens, hundreds and/or thousands of miles). The use of the one or more pipeline networks 120 and/or sub-networks is typically controlled by one or more third-party entities. For example, a first entity may control a gas resource provider 202_1 and a pipeline 210*a*, a second entity may control connections 204*a*, 204*b* and 204*c*, and the pipeline sections 210*b* and 210*d* between these connections, a third entity may control node 204*d* and pipeline 210*e*, a fourth entity may control pipeline section 210*f*, and a fifth entity may control connection 204*e* and pipeline 210*g*. Further, these different entities typically each control respective costs associated with distribution of the gaseous resource and/or utilization of these components of the pipeline network 120. Additionally, these costs can vary according to a plurality of factors, which can include, for example, one or more of gas demand, pipeline availability, pipeline maintenance, weather, forecasted demand, time of scheduling, time of requested delivery, other such factors, and typically a combination of two or more of such factors.

Based on each request, the simulation control circuit can automatically obtain, over the distributed communications network 104, data from a plurality of data sources 106. Again, these different data sources can include data sources provided by the third-party pipeline entities, third party source entities, market sources, environmental sources and/or other sources of data that can be relevant to gas demand, distribution and/or the transportation of gas. In some embodiments, the simulation control circuit can automatically simulate a plurality of potential pathways of the gas pipeline network between one or more gaseous resource providers 202 to the intended destination location (e.g., connection 204*f*) to meet the request. Further, the simulation can apply filtering, algorithms and/or machine learning to improve the simulations in part by optimizing the simulations to eliminate some potential paths that should not be simulated because of one or more threshold factors. For example, the simulation control circuit can simulate a first potential pathway from a first resource provider 202_1 and through connections 204*a*, 204*b*, 204*c*, 204*d*, 204*e* and to connection 204*f*; a second potential pathway from the first resource provider 202_1 and through connections 204*a*, 204*b*, 204*c*, 204*i*, 204*j*, 204*d*, 204*e* and to connection 204*f*; a third potential pathway from a second resource provider 202_2 through connections 204*b*, 204*k*, 204*n*, 204*g*, 204*e* and to connection 204*f*; a fourth potential pathway from a third resource provider 202_4 and through connections 204*d* and 204*e* and to connection 204*f*; and/or other potential pathways. In some embodiments, the simulation utilizes distributed computational processing over multiple different computing systems to simulate the different potential pathways between one or more resource providers 202 and the intended destination that are available during a predicted transport duration of time in order to deliver the requested quantity of gas to the intended destination within a threshold time of the requested delivery time and/or delivery window of time.

The pipeline pathway simulation system 108 can, in some embodiments, improve computational pipeline simulation processing while reducing the computational complexity and overhead, in part, through the application of a predefined set of computer implemented rules, algorithms and/or machine learning that can identify pipeline sections and/or connections that cannot be utilized, may have insufficient capacity, may be unavailable, may be overprescribed and/or other such factors. Such predefined set of computer implemented rules, algorithms and/or machine learning are not applied by humans in evaluating pipeline networks in part because they instead apply shortcut evaluations in order to complete the processing in weighting different potential pathways, disregarding many potential pathways in part because of subjective determinations and/or biases that result in inaccurate conclusions, and subjectively disregard some pathways based on incorrect interpretation of data. In applying the computer implemented predefined set of rules, algorithms and/or machine learning, the pipeline pathway simulation system 108 can obtain an intended capacity of the gaseous resource to be acquired from one or more gaseous resource providers and implement a repetitive evaluation of numerous different connects along the various different potential pathways. As such, the simulation in part excludes multiple pipeline pathways while identifying multiple different potential pathways that can possibly be utilized in routing the requested quantity of gas from one or more resource providers 202 to an intended destination. In some embodiments, the simulation in identifying of the multiple potential pathways can identify a first connection 204 of a potential recommended pathway and one or more potential corresponding pipeline sections 210 directly, fluidly coupled with the first connection 204.

In some embodiments, the pipeline pathway simulation system 108 can apply one or more algorithms based on graph theory that can apply one or more algorithms, calculations and/or machine learning models in modeling pairwise relations between connections 204 or nodes, and/or pipeline sections 210 or edges, in identifying and setting up series of connections and pipeline sections for the transporting of the gaseous resources within a constrained system. Some embodiments apply relatively simple equations based in part on the pipeline network infrastructure that may limit variations in routing the gas between one or more sources to an intended destination, and/or limited flexibilities in tariffs of the respective sections of pipeline. Similarly, users can set one or more limits, thresholds, overrides and/or other actions to enhance the automated pipeline scheduling. Some embodiments can apply a tiering and/or establish a prioritization of the different potential sections of pipeline of the one or more potential routes between the one or more sources and the intended destination, based in part on an optimization of economic factors and/or resulting total cost relative to at least timing to meet one or more demands of the intended recipient at the intended destination. Additionally or alternatively, in some embodiments, some or all of the pathway identification simulations can be performed by one or more a pathway simulation machine learning models that can be trained over time according to a corpus of pathway criteria, real-time status and/or other information, pathway limitations, capacity, historic recommended gas schedules, user responses to such historic recommended gas schedules (e.g., accepting, rejecting, changing parameters, etc.) and/or other relevant pathway information, and repeatedly retrained over time based on historic pathway identifications, feedback from historic pathway identifications, subsequent user actions based on identified pathways and/or recommendations, user modifications to one or more criteria and/or factors, other such feedback or a combination of two or more of such feedback over time, resulting in one or more modified pathway simulation machine learning models that can be applied.

Processing of the simulations, in some embodiments, can include multiple sub-processes, which can include data collection, identification of nodes, identification of edges, processing of connections, processing of edges, the generation of one or more recommended pathways, and the control of a user device to render a graphical user interface that can present the one or more recommended pathways. The collection of data can include, in some implementations, the identification and/or collection of raw data that can be processed to identify and/or select relevant nodes and edges corresponding to one or more sources and the intended destination. Some embodiments process connections through the simulation of the different nodes and edges relative to volumes of gaseous flow, time, demand and/or other such factors as described above and further below. One or more or each connection may have a priority and/or a priority may be established. This priority may be based on, for example, the volume need and/or volume capacity, tariff availability at each point, and/or other such factors. A fixed transport may be defined for one or more or each edge. Remaining volume may, in some instances, be satisfied through a get edges process that can identify, select and/or generate an edge for each of the simulated paths. The combination of nodes and edges for each potential pathway can be evaluated and one or more potential pathways can be sent to the graphical user interface for display.

The intended gaseous quantity of the gaseous resource intended to be acquired from the first gaseous resource provider over an intended period of time can be determined from the request. For example, in some cases, pipeline scheduling is implemented in advance of the intended delivery period of time, such as the day before. A first connection of a first potential pathway can be identified and a corresponding downstream first pipeline section directly, fluidly coupled with the first connection and similarly be identified based on the first connection. A first destination capacity of the first pipeline section to confirm that the first destination capacity can satisfy the requested gaseous quantity. The identification of one or more additional downstream connections can be identified that are each fluidly coupled with a respective additional pipeline section, of the first potential pathway. Respective destination capacities of the downstream pipeline sections can be evaluated to confirm that each have respective destination capacities equal to or greater than the intended quantity. When one or more of the downstream pipeline sections cannot satisfy the capacity, the first potential pipeline pathway may be excluded as a potential pipeline for further consideration. As such, a confirmed potential pathway can comprise the first connection and first pipeline section, and each of the one or more additional connections and the respective additional pipeline sections. As one non-limiting example, a first connection 204*b* of a first recommended pathway can be identified, and a first pipeline section 210*d* that is directly, fluidly coupled with the first connection 204*b* can be identified. A first destination capacity of the first pipeline section 210*d* can be obtained (e.g., from one or more third party sources). The pipeline pathway simulation system 108 can continue to repeatedly identify one or more additional connections (e.g., connection 204*c* and 204*k*) each fluidly coupled with a respective additional pipeline section (e.g., pipeline sections 210*e* and 210*h*, and pipeline sections 210*i* and 210*j*, respectively) each having respective additional destination capacities is equal to or greater than the intended capacity. As such, a first recommended pathway, having at least the capacity, is determined having the first connection and first pipeline section, and each of the one or more additional connections and the respective additional pipeline sections. This identification of potential pipeline pathways can be repeated numerous times between each of one or more resource providers 202 and a series of one or more connections 204 each interconnected by one or more pipeline sections 210 to an intended destination (e.g., 204*f*), with each of the identified potential pathways having the sufficient capacity to satisfy the requested quantity (e.g., 202_1, 204*a*, 204*b*, 204*c*, 204*d*, 204*e*, 204*f*; 202_1, 204*a*, 204*b*, 204*c*, 204*i*, 204*j*, 204*d*, 204*e*, 204*f*; 202_1, 204*a*, 204*b*, 204*k*, 204*n*, 204*g*, 204*f*; 202_1, 204*a*, 204*b*, 204*k*, 204*n*, 204*g*, 204*e*, 204*f*; 202_2, 204*b*, 204*c*, 204*d*, 204*e*, 204*f*; 202_2, 204*b*, 204*c*, 204*i*, 204*j*, 204*d*, 204*e*, 204*f*; 202_2, 204*b*, 204*k*, 204*n*, 204*g*, 204*f*; 202_2, 204*b*, 204*k*, 204*n*, 204*g*, 204*e*, 204*f*; 202_2, 204*o*; 202_3, 204*h*, 204*g*, 204*f*; 202_3, 204*n*, 204*g*, 204*f*; 202_3, 204*h*, 204*g*, 204*e*, 204*f*; 202_3, 204*n*, 204*m*, 204*l*; 202_4, 204*d*, 204*e*, 204*f*; etc.). Further, in some embodiments, the application of the predefined ruleset identifies each potential alternatively pathway between the respective resource provider 202 and the intended destination that satisfy the one or more rules, including at least the requested capacity. In some implementations, the simulation identifying the relevant potential pathways can prevent a user from trying to select or define a pathway that cannot be established based on one or more factors.

It is noted that these example pathways are used to illustrate processes according to some embodiments, and that in some implementations, the number of resource providers and potential pathways to be evaluated is significantly higher. Further, in some embodiments, the evaluation of numerous potential pathways from provider to customer is time sensitive, and in some cases, the evaluation, which typically includes the multiple simulations, is completed in a short interval, e.g., a few minutes, a few seconds. The simulations and/or evaluation can be repeated over time and/or additional requests can be received, and the simulations can be refreshed with updated and/or new information when relevant. Some reevaluations are automatically initiated based on detected changes and/or threshold changes to one or more parameters and/or conditions, and/or in response to a user initiation.

In some embodiments, the pipeline pathway simulation system 108, in identifying the multiple different potential pipeline pathways, further simulates each of the identified potential pipeline pathways based on the access to the multiple different data sources 106 and the application of risk factor rules to identify one or more risk factors corresponding to one or more gas sources and/or gas providers, one or more connections 204 of the numerous connections, and/or one or more pipeline sections 210 along the respective simulated potential pipeline pathways. These risk factors can be based on one or more different criteria, real-time information, historic information, predictive and/or forecasted information, and/or other such information locally maintained and/or accessed from one or more data sources 106. As some non-limiting examples, the risk factors can correspond to total capacity relative to a connection 204 and a known and/or predicted demand through that connection by one or more additional requests from one or more other consumer entities, expected maintenance, unexpected real-time information corresponding to a current state of operation and/or reduced capacity (e.g., connection operating a below maximum capacity for one or more reasons), market demands of the requested gas and/or market predicted demand, costs associated with each connection 204 and/or pipeline section 210 of a respective potential pathway, a schedule entity's contract capacities associated with one or more or each connection 204 and/or pipeline section 210 of a respective potential pathway, and/or other such risk factors corresponding to individual connections 204, pipeline sections 210 and/or risk factors of a respective potential pipeline pathway.

The simulation can include the application of risk factor rules in evaluating of one or more risk factors relative to one or more corresponding thresholds. In some embodiments, the pipeline pathway simulation system 108 can identify that a first risk factor, corresponding to a first potential pathway, has a predefined relationship with a corresponding risk threshold. For example, a cumulative cost of the first potential pathway may have a predefined relationship with a cost threshold; a real-time current contracted allocation of gas flow through a first connection (e.g., connection 204*e*) by one or more other parties has a predefined relationship with a connection capacity threshold; etc.). The simulation can continue, in some embodiments, in response to identifying a determined first risk factor corresponding to, for example, a first connection along a first potential pathway that has the predefined relationship with a corresponding first risk threshold, and identify a second gaseous resource provider 202 that is different than a first gaseous resource provider along a different potential pipeline pathway that does not include the first connection based on the first risk factor having the predefined relationship with the first threshold. Based on the identification of the second resource provider (e.g., 202_3), the simulation can automatically simulate multiple additional potential pathways of the gas pipeline network between the second gaseous resource provider to the requested destination location to meet the request.

The pipeline pathway simulation system 108, in some embodiments, further evaluates the identified potential different pathways relative to the risk factors in ranking the identified plurality of potential pipeline pathways, or otherwise identifying one or more recommended pathways. One or more ranking rules, one or more algorithms and/or one or more trained ranking machine learning models can be applied relative to the set of multiple different risk factors in identifying a recommended ranking or order of the different potential pipeline pathways. In some embodiments, the ranking rules can include applying one or more weighting rules to one or more of the different risk factors. The weighting can be based on weighting factors that are specific to the requestor and/or scheduling entity, can vary over time, can be dependent on one or more other risk factors and/or a relationship of a risk factor to one or more weighting thresholds, and/or other such criteria. The prioritization and/or ranking may be dependent on a particular entity, such as reliability factors having a highest ranking, while economic risk factors having a second level priority. Other entities may apply different rankings. Similarly, the rankings may be determined over time, such as through feedback and/or machine learning. In some embodiments, a ranking machine learning model is trained over time based a corpus of risk factors, criteria of risk factors, ranking factors, and/or other relevant information, and repeatedly retrained over time based on historic rankings, feedback from historic rankings, subsequent user actions based on rankings, modifications to one or more criteria and/or factors, other such feedback or a combination of two or more of such feedback over time, resulting in one or more modified ranking machine learning models that can be applied.

Based at least in part on the simulation, the pipeline pathway simulation systems 108 can automatically generate and output a pathway recommendation to a user for consideration and selection of a desired pipeline pathway to schedule. The pathway recommendation can, in some embodiments, include a recommendation listing of one or more, and typically two or more listings of two or more different potential pathways. The different potential pathways can have one or more different connections and/or different resource providers 202, different timing, different gas quantities from different sources, and/or other such differences. For example, a pathway recommendation can include a first recommended pathway of the gas pipeline network 120 to meet the request, and typically one or more additional potential pathways. Typically, the pathway recommendation further includes financial costs associated with each of the one or more recommended pipeline pathways. These costs can be a total cost, and/or can include sub-costs for different aspects and/or portions of the respective recommended pathway.

In some embodiments, the pipeline pathway simulation system 108, in executing a simulation application and/or a recommendation application, can be configured to automatically generate a recommendation graphical user interface (GUI) and control a transceiver system of the pipeline pathway simulation system 108 to communicate relevant information to control a display of a user computing system 124 to render the recommendation graphical user interface that comprises the pathway recommendation. As introduced above and further described below, the pathway recommendation can, in some embodiments, comprise a listing of one or more recommended pathways (e.g., a first recommended pathway and one or more additional recommended pathway). The rendered pathway recommendation typically further renders, in association with the recommended pathways, the associated financial costs corresponding to the respective pathways. In some embodiments, the associated financial costs can further include costs associated with two or more pipeline sections 210 or sub-pipelines of a respective recommended pathway. Typically, two or more or each pipeline sections can be operated by a different one of the third-party pipeline entities and/or having different corresponding costs. Similarly, with regard to the one or more alternative recommended pipeline pathways, the graphical user interface can display the associated alternate financial costs corresponding to two or more pipeline sections of the one or more additional recommended pathways, with the pipeline sections often being operated by a different one of the third-party entities and/or having different costs. In some embodiments, the GUI displaying the pathway recommendation enables a user to activate an expand option that cause further details to be presented, such as a pathway expand option that expands to display more details about the recommended pathway (e.g., details about individual pipeline sections), cost expansion option that upon selection presents further details about the one or more portions of the recommended pipeline pathway (e.g., costs for different connections 204 and/or pipeline sections 210, costs based on timing, additional costs based on one or more factors (e.g., prioritization, congestion, contract rights, etc.)), and/or other such options.

In some embodiments, the pipeline pathway simulation system 108 can identify reasoning based on the simulations and/or threshold relationships, and incorporate into the pathway recommendation explanation data that includes the reasoning corresponding to one or more of the recommended pipeline pathways, and/or non-recommended pipeline pathways. This explanation data, in some embodiments, can provide information about the risk factors identified, such as risk factors that correspond to positive factors and/or decreased risk, which contribute to a higher or more positive ranking, risk factors reducing a ranking and/or corresponding to increased risk, and/or other such information. The explanation data can be numerical, one or more words, a brief summary, one or more graphs and/or graphics, other relevant information and/or a combination of two or more of such information utilized in simulating and/or evaluating the different potential pipeline pathways. Recommendation data for a recommended pathway can explain reasonings for recommending a particular recommended pathway, in some instances reasoning for not recommending a pathway, and/or reasoning for rankings of potential pathways. As one representative, non-limiting example, recommendation data may comprise a notification of a particular risk factor corresponding to a first connection 204 having a predefined relationship with at least one risk threshold and/or criteria threshold. Another non-limiting example can include recommendation data corresponding to a second recommended pathway, of a plurality of additional potential pathways, explaining reasoning for recommending the second recommended pathway being to avoid a specific connection 204. Other explanation information may include, but is not limited to one or more of cost, capacity, demand at a particular connection 204 and/or pipeline section 210, predicted availability (e.g., based on forecasted weather), other such data, and typically a combination of two or more such explanation data.

In some embodiments, further detailed information may be accessed by the user, such as through the GUI, about the recommended pathways, the parameters applied in identifying and/or evaluating the different potential pathways, and/or other such information. Still further, some embodiments enable a user to make modifications to one or more parameters, and initiate a re-simulation of one or more potential pathways and/or re-identification of potential pathways based on the modifications. In some embodiments, the pathway scheduling control circuit and/or simulation control circuit, when executing one or more respective software, can be configured to receive from a user, following a simulation and/or in response to outputting one or more initial and/or subsequent recommended pathways of the gas pipeline network, a modified value of a one or more parameter of a plurality of different parameters applied during the initial simulation. Such parameters can include substantially any relevant limits, thresholds, criteria, ranges, preferences, alternatives, and other such parameters utilized in identifying, simulating and/or evaluating potential pipeline pathways. Based on the revised and/or adjusted one or more parameters, the pipeline pathway scheduling system 102 can automatically re-simulate at least one revised potential pathway of the gas pipeline network 120 between a first gaseous resource provider 202 to the intended destination location (e.g., connection **204*f*) to satisfy at least some and typically all of a request while applying the modified value of the one or more parameter. A revised pathway recommendation can automatically be outputted that includes one or more revised recommended pathways, and typically further includes revised associated financial costs corresponding to the one or more revised recommended pathways based on the plurality of potential pathways and/or the one or more revised potential pathways. Enabling the user to modify one or more parameters allows the user to have greater control over the system, such as when the user is aware of one or more factors and/or to force one or more conditions (e.g., intentionally avoiding a portion of the pipeline network), and/or to obtain alterative options. The recommendation GUI, in some embodiments, may provide a pictorial representation of one or more portions of the pipeline network 120 along with corresponding parameters corresponding to different components (e.g., connections 204, pipeline sections 210, resource providers 202**, etc.), such as through one or more dropdown options. The graphical representation of the portion or portions of the gas pipeline network may highlight one or more components to show one or more recommended pipeline pathways, and/or the GUI may enable the user to select which of the recommended pipeline pathways are highlighted. Still further, in some embodiments, the GUI may enable the user to modify one or more of the parameters directly from the graphical display. Additionally or alternatively, the user may access one or more listings of parameters and corresponding set values, with the ability to modify one or more of those set values.

In some embodiments, the pipeline pathway scheduling system 102, in generating the pathway recommendation, is configured to incorporate the listing of multiple different potential pathways and respective rankings and/or scoring based on a ranking of the potential recommended pathways. The displayed pathway recommendation can list one or more, and typically two or more recommended pathways (e.g., a first recommended pathway and second recommended pathway) along with corresponding explanation data explaining reasonings for recommending the respective recommended pathway. The respective reasoning can include a respective pathway score, an estimated respective cost and a respective set of one or more risk factors. Typically, the score is determined based on the estimated respective cost and the respective set of one or more risk factors. For example, the pathway recommendation can identify a first recommended pathway along with first explanation data explaining reasoning for recommending the first recommended pathway and comprising a first pathway score, an estimated first cost and a first set of one or more risk factors, with the first pathway score being based on the estimated first cost and the first set of one or more risk factors, and one or more other recommended pathways with such as an nth recommended pathway with nth explanation data explaining reasoning for recommending the nth recommended pathway and comprising an nth pathway score, an estimated nth cost and an nth set of one or more risk factors, with the nth pathway score being based on the estimated nth cost and the nth set of one or more risk factors.

As described above, the pathway recommendations can identify one or more recommended pipeline pathways that can be used to satisfy a gaseous request, and this pathway recommendation may be presented through the control of a display of a user computing system 124 to present the recommendation GUI. In some embodiments, the recommendation GUI can leverage the data and/or evaluation as described above and further below to generate one or more listings, graphical representations, mappings, etc. that identify the one or more recommended pathways. For example, a simplified GUI may list potential pathways that may further include the volumes per pipeline and per contract between receipt/delivery points or nodes. The recommendation GUI, in some implementations, can highlight parameters, factors and/or areas that the users can flex and/or may be able to adjust the values or select alternative contracts/paths. In some embodiments, the recommendation GUI may include a summary table comprising a listing of one or more recommended pathways and/or nominations. The recommendation GUI, in some embodiments, can include a respective selection option corresponding to each recommended pipeline pathway presented in the recommendation GUI, or other such methods to select one or more of the recommended pathways. The selection options enable a user to select one of the recommended pipeline pathways as a pipeline pathway to be scheduled in satisfying the particular gas request. Accordingly, through the displayed pathway recommendation, the pipeline pathway scheduling system 102 can receive a user selection of one or more selected recommended pathways from the list of recommended pipeline pathways in the pathway recommendation. The selected recommended pipeline pathway can be used to initiate the generation of a pipeline nomination in scheduling the relevant connections 204 and pipeline sections 210, where the pipeline nomination can comprise a request to move gas from one location to another. In some embodiments, a nomination can provide one or more times of the gas transfer from the source and/or through connections 204 and pipeline sections 210 of an intended pathway between an intended resource provider 202 and an intended destination, and other relevant information as is customary in such gas transfer nominations, and which can be used in scheduling gas transfers.

In some embodiments, the pipeline pathway scheduling system 102 can initiate and/or implement the nomination generation system 110 based on the selected recommended pathway. The nomination generation system 110 can access the relevant information about each of the resource provider 202, the connections 204, the pipeline sections 210 of the selected recommended pathway, acquire relevant information including timing information of gas delivery for the request, and/or other relevant information, and automatically format a nomination for the selected recommended pathway. The formatted nomination can include at least some, and typically all formal requirements of each of one or more of the third-party entities that each have control over a portion of the gas pipeline network 120 establishing the selected recommended pathway (e.g., the resource provider 202, third-party entities that control one or more connections 204 and/or pipeline sections 210, governmental regulatory entities when relevant, and/or other such entities).

The nomination can dictate time of the gas transfer from the source and/or through the connections 204 and pipeline sections 210 of the intended pathway between the resource provider 202 and the intended destination, quantity to be transferred and in some instances quantity to be transferred through each connection 204, and other relevant information as is customary in such gas transfer nominations. In some embodiments, the pipeline pathway scheduling system 102 and/or the nomination generation system 110 can automatically access, via the one or more distributed communications networks 104, and control one or more separate electronic submission systems 114 through the one or more communication protocols and electronically submit the nomination of the selected recommended pathway for the request for the gaseous resource to the electronic submission system 114 for execution. The one or more electronic submission systems 114, such as one or more electronic bulletin board (EBB) systems, Energy Trading Risk Management (ETRM) systems, and/or other relevant electronic submission systems, can be operated by the third parties that control the different parts of selected recommended pathway, can be operated by one or more separate entities that enable the third party pipeline entities to access the nomination, operated by one or more governmental entities, and/or other such entities. The nomination can be formatted to comply with one or more specific communications protocols, formats and/or electronic submission systems into which some or all of a negotiation can be submitted in scheduling the control of gas transfers consistent with the selected recommended pathway or pathways. In some embodiments, each third-party entity controlling a portion of the pipeline pathway of a selected recommended pathway maintains their own electronic submission system, and portions of the nomination can be formatted consistent with the respective electronic submission systems and/or data can be extracted from the nomination consistent with a format of the respective electronic submission systems. The communication and uploading of the nomination can enable the one or more third parties controlling different parts of the selected recommended pipeline pathway to accept the respective portion of nomination. Through the nomination, the pipeline pathway scheduling system 102 controls the different portions of the one or more geographically distributed pipeline networks 120 in controlling the transfer of one or more gaseous resources between different source providers to intended consumer entities.

In some embodiments, the pipeline pathway scheduling system 102 can over time continue to re-evaluate and/or re-simulate one or more potential and/or recommended pathways. This enables the system to continue to monitor real-time information and provide notification to users of potential issues, problems and/or newly identified more recommended pathway options as a result of real-time changes. This re-evaluation and/or re-simulation can be implemented following the identification of potential pathways, following providing the pathway recommendation, following a selection by a user of a potential pathway, following the generation of a nomination, following the uploading of the nomination and/or at other times prior to an initiation of an actual transfer of a gaseous resource through the pipeline network 120. The pathway scheduling control circuit and/or pipeline pathway simulation control circuit, executing a respective application, can in some embodiments automatically re-access, at a later period of time, such as following a user selection of the selected recommended pathway and/or after the formatting of the nomination, at least one of the plurality of data sources 106

Real-time current data corresponding to the selected recommended pathway can be retrieved from one or more of the plurality of data sources. Based on the real-time data, it may be determined that a re-simulation is to be activated. This determination may be based on respective threshold changes of values corresponding to one or more parameters (e.g., change in demand, change in weather, change in pricing, change in maintenance, change in availability, etc.), based on one or more threshold amounts of elapsed time, and/or other such instance. Similarly, the re-evaluation and/or re-simulation may be implemented based on a schedule, continuously, in response to a user request, and/or other such instances. The control circuit can automatically re-simulate one or more and typically two or more of the plurality of potential pathways based on the real-time current data, and automatically output an updated recommendation comprising one or more updated recommended pathways of the gas pipeline network 120 to meet the request. Similar to that described above, the updated recommendation can include reasoning data, such as, but not limited to, associated financial costs corresponding to the one or more updated recommended pathways based on the re-simulation, risk factors, a ranking and/or score, other such information, and often a combination of two or more of such information. Again, the reasoning data may not be immediately displayed in the updated recommendation but may be accessible through one or more options that can be activated by the user to access the reasoning data and/or more details about one or more of the reasoning data. The re-evaluation and/or re-simulation enables the pipeline pathway scheduling system 102 to provide more beneficial recommended pathways over time based on current information available. Again, the user can review the updated recommendation and implement modifications to one or more of the parameters to initiate further re-simulation and/or re-evaluation.

The automated pipeline scheduling and control system 100, in some embodiments, further includes the reconciliation system 112, which can be implemented through one or more reconciliation control circuits that are communicatively connected to one or more user computing systems 124 via the one or more distributed communications networks 104. The reconciliation system 112 is configured to execute one or more reconciliation applications to implement reconciliations between different systems scheduling and implementing the gaseous resource transfer. A reconciliation process can, in part, evaluate actual gaseous resource flows and/or deliveries relative to the pipeline schedules based on uploaded nominations. This audit or reconciliation enables confirmations of orders, aligning different aspects of contracts, confirmation of invoicing, and/or other consistency between systems. The reconciliation process can be implemented while and/or following delivery of the gaseous resource via the selected one or more recommended pathways. In some embodiments, the reconciliation system 112 can automatically access, via the one or more distributed communications networks 104, quantity delivery information from one or more of the third-party entities (e.g., gas providers, pipeline control entities, etc.) controlling a gas source and/or at least a pipeline section 210 of the selected recommended pathway. The quantity delivery information can specify a quantity intended to be supplied through the respective pipeline section 210, through a connection 204 and/or from a gas resource provider 202. Recipient accounting data can automatically be accessed, via the distributed communications network, by the reconciliation system 112 from an intended recipient of the request comprising a determined delivered quantity of the gaseous resource received by the intended recipient. In some embodiments, the reconciliation system 112 further automatically accesses actual costs charged in association with the distribution of the gaseous resource of the nomination. Other information corresponding to an actual transfer of at least some of the scheduled gaseous resource can similarly be accessed.

The relevant information corresponding to the actual gas transfer can be evaluated based on a predefined set of computer implemented reconciliation rules applying one or more reconciliation algorithms and/or machine learning models, and the reconciliation system 112 can automatically reconcile the nomination by determining when there are consistencies and/or one or more variations between the nomination and each of the quantity delivery information, the determined delivered quantity of the gaseous resource, the accessed costs associated with distribution of the gaseous resource of the nomination, and/or other such relevant information corresponding to the actual distribution of the gas resource based on one or more scheduled pipeline transfers in accordance with one or more accepted nominations. The reconciliation system 112 can generate reconciliation information and control one or more user computing systems 124 to render a reconciliation graphical user interface that is configured to display the one or more variations between the nomination and each of the quantity delivery information, the determined delivered quantity of the gaseous resource, and the accessed costs associated with distribution of the gaseous resource of the nomination, confirmation of consistency between actual gaseous resource flow and scheduled flow, other such reconciliation information, or a combination of two or more of such information. The reconciliation process, in some embodiments, utilizes the intent of the trades being entered and how these translate to what is being nominated on the pipeline electronic submission systems 114. Additionally or alternatively, a reconciliation can be implemented, in some embodiments, after information is collected on the volumes that actually flowed on each pipeline, which can include actualization of post cut(s) reconciliation.

Figure 3:
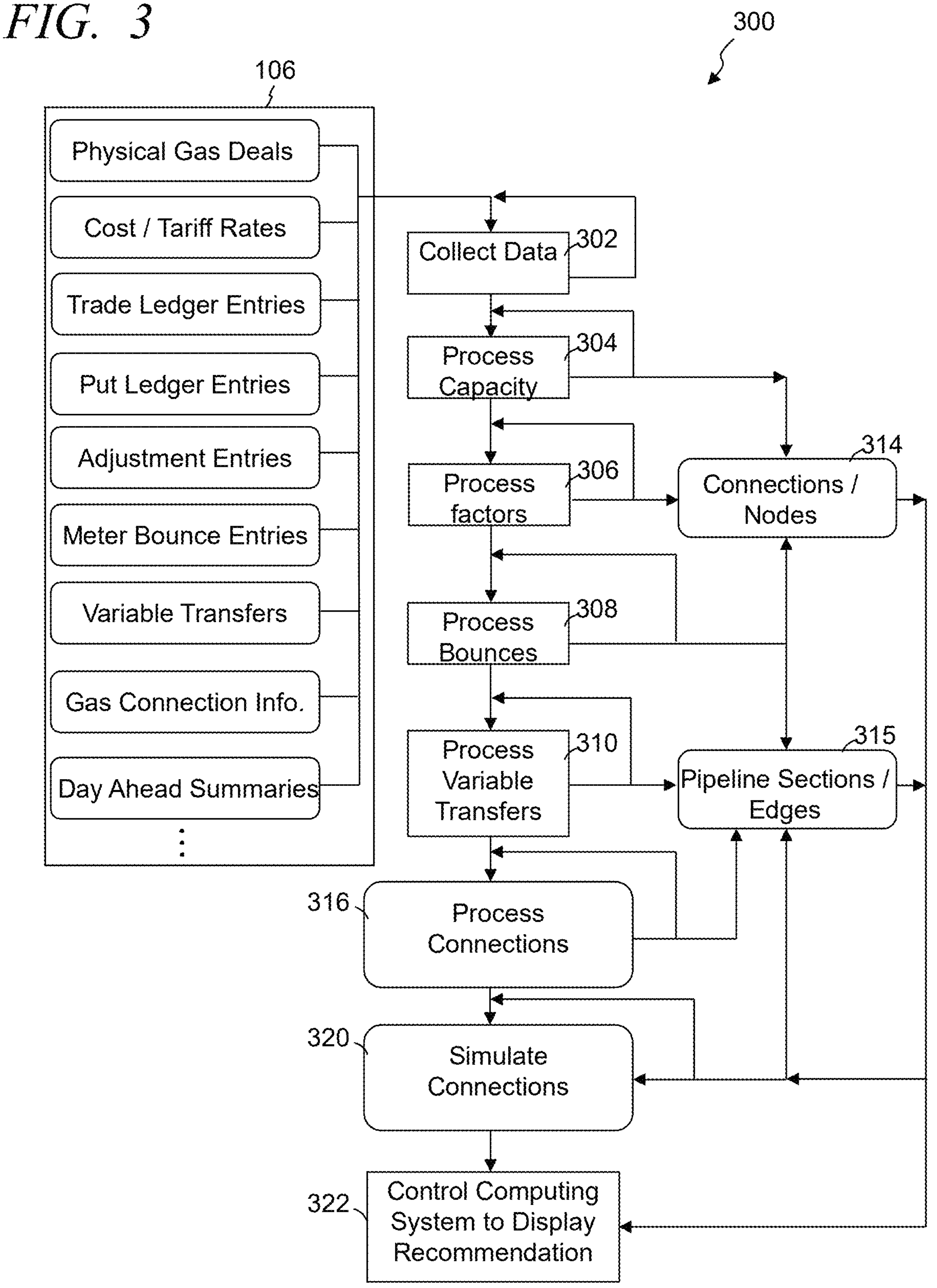
FIG. 3 illustrates a simplified flow diagram of an exemplary scheduling process of scheduling gaseous resources, in accordance with some embodiments.

FIG. 3 illustrates a simplified flow diagram of an exemplary scheduling process 300 of scheduling gaseous resources, in accordance with some embodiments. In step 302, data sources 106 can be accessed to obtain relevant information used in evaluating and simulating different potential pipeline pathways for one or more gas requests intended to be fulfilled at a future time. As described above, the data sources 106 can be local data sources managed by the scheduling entity, and remote data managed by one or more third-party entities. The data sources 106, for example, can include information about gas trades and/or deals, costs data associated with gas transport through the one or more pipeline network 120, which may include costs of utilization of one or more pipeline sections 210 and/or connections 204, historic trade information, weather information, predicted cost information, and/or other such data.

In step 304, the data is processed in relation to one or more gas requests in relation to available capacities and/or total capacities relative to different pipeline sections 210 between sources and one or more intended destinations. This can take into consideration planned maintenance, known outages, and/or other such information. In some embodiments, the evaluation relative to capacity can provide an initial set of potential pipeline pathways that individually and/or two or more collectively can satisfy one or more requests. In step 306, further factors affecting transport flow through one or more pipeline sections 210 and/or connections 204 are processed relative to current and predicted demand, weather (current, historic and/or predicted), already scheduled flows, and/or other information. In step 308, some embodiments process historic and/or expected performance (e.g., bounces, cuts, etc.), and/or other information, which can provide, for example, reliability information. In step 310, variable transfer information and/or other relevant predicted and/or historic variations and/or information can be evaluated.

The processing of the data can further limit and/or exclude one or more potential connections 204 and/or pipeline sections 210 from consideration for one or more intended gas transfers, in identifying the potentially viable connections 314 (e.g., entry and/or exit points along respective portions of the pipeline network operated by a third-party entity) and potentially viable pipeline sections 315 that can be considered in determining potential pipeline pathways for each one or more requested gas transfers, limiting the number of potential pipeline pathways based on these one or more factors and/or respective relationships to one or more thresholds providing a limited or sub-set of potential pipeline pathways.

In step 316, the identified potentially viable connections can be further processed in identifying potentially viable potential pathways that are predicted to satisfy a gas request. In step 320, the pipeline pathway and/or gas flow through different series of the potential connections are simulated relative to real-time information and predicted factors to identify potential pipeline pathways for a particular gas request. In step 322, a pipeline recommendation can be generated that typically identifies multiple different recommended pipeline pathways based on cost, availability, and other relevant risk factors. As described above, some embodiments can rank the potential pipeline pathways and/or provide a relative score.

Figure 4:
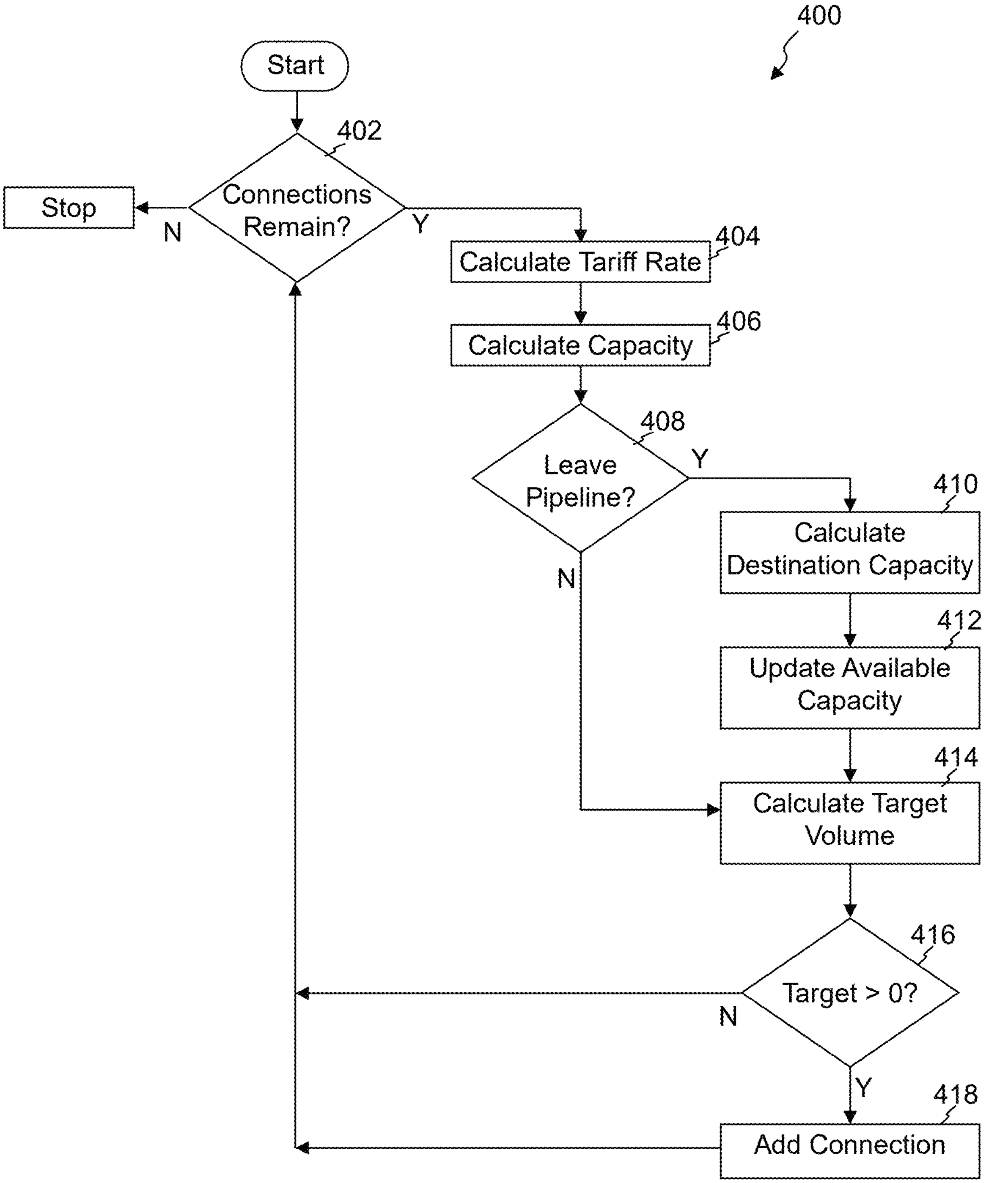
FIG. 4 illustrates a simplified flow diagram of an exemplary connections evaluation process, in accordance with some embodiments.

FIG. 4 illustrates a simplified flow diagram of an exemplary connections evaluation process 400, in accordance with some embodiments. The connections evaluation process 400 can be used in some embodiments to implement step 316 of the scheduling process 300. Further, the connection evaluation process 400 can be implemented, in some embodiments, for each potential pipeline pathway, and can occur between connections 204, typically downstream, along a potential pipeline pathway. In step 402, a connection 204 is identified along a potential pathway that has yet to be processed with respect to one or more requests. In step 404, costs (e.g., tariff rates) are determined to schedule gas flow between that node and a preceding resource provider and/or connection. In step 406, an available destination capacity leaving that connection is determined. Capacity can vary between different pipeline sections, the scheduling entity may have different contractual rights to different pipeline sections limiting capacity available to that scheduling entity, different pipeline sections can have different demands and/or contractual capacity rights of different entities, and/or other factors can affect an available capacity that can potentially be utilized. Similarly, in some instances, an available capacity may be limited based on maintenance, performance, and/or other such factors.

In step 408, it is determined whether the gas is leaving a pipeline section 210. When the gas is leaving, the process can advance to step 410 where an available destination capacity of a subsequent connection and/or pipeline can be determined. In step 412, the available capacity can be updated. When the gas is not leaving or after the available capacity is updated, the process can advance to step 414 where a remaining target quantity or volume that is to be satisfied for the request can be determined. In step 416, the remaining target quantity can be evaluated to determine whether less than all of the requested quantity still needs to be routed from the resource provider(s). When less than all of the requested quantity has not been satisfied, the process can advance to step 418, where an additional pipeline section 210 along a potential pipeline path can be identified and/or added. When less than all of the requested quantity has been satisfied or after a connection is added, the connection evaluation process 400 can return to step 402 to determine whether one or more additional connections can be utilized to satisfy the transportation of a remaining gas quantity not satisfied by one or more previously evaluated potential pipeline pathways. When no further connections are available, the potential pathway may be designated as unavailable. As such, the connections evaluation process 400 can identify one potential pipeline pathway that can satisfy a full request, or identify a set of two or more potential pipeline pathways that cooperatively can satisfy a full requested quantity of gas. In some embodiments, when it is determined in step 414 that the full requested quantity has been satisfied, the process can stop for a particular potential pathway. This process 400 can be repeated any number of times for any number of potential resource providers and/or substantially any potential pathway to identify viable potential pathways and/or one or more sets of potential pathways that individually or collectively can satisfy the request. The connection evaluation process 400 can help in ensuring over prescribing a pipeline section and/or connect, limitation and/or evaluating potential risk of being cut based on scheduling over a scheduling entities contractual available capacity, and/or other such considerations. The connection evaluation process 400 can identify multiple different potential pipeline pathways.

Figure 5:
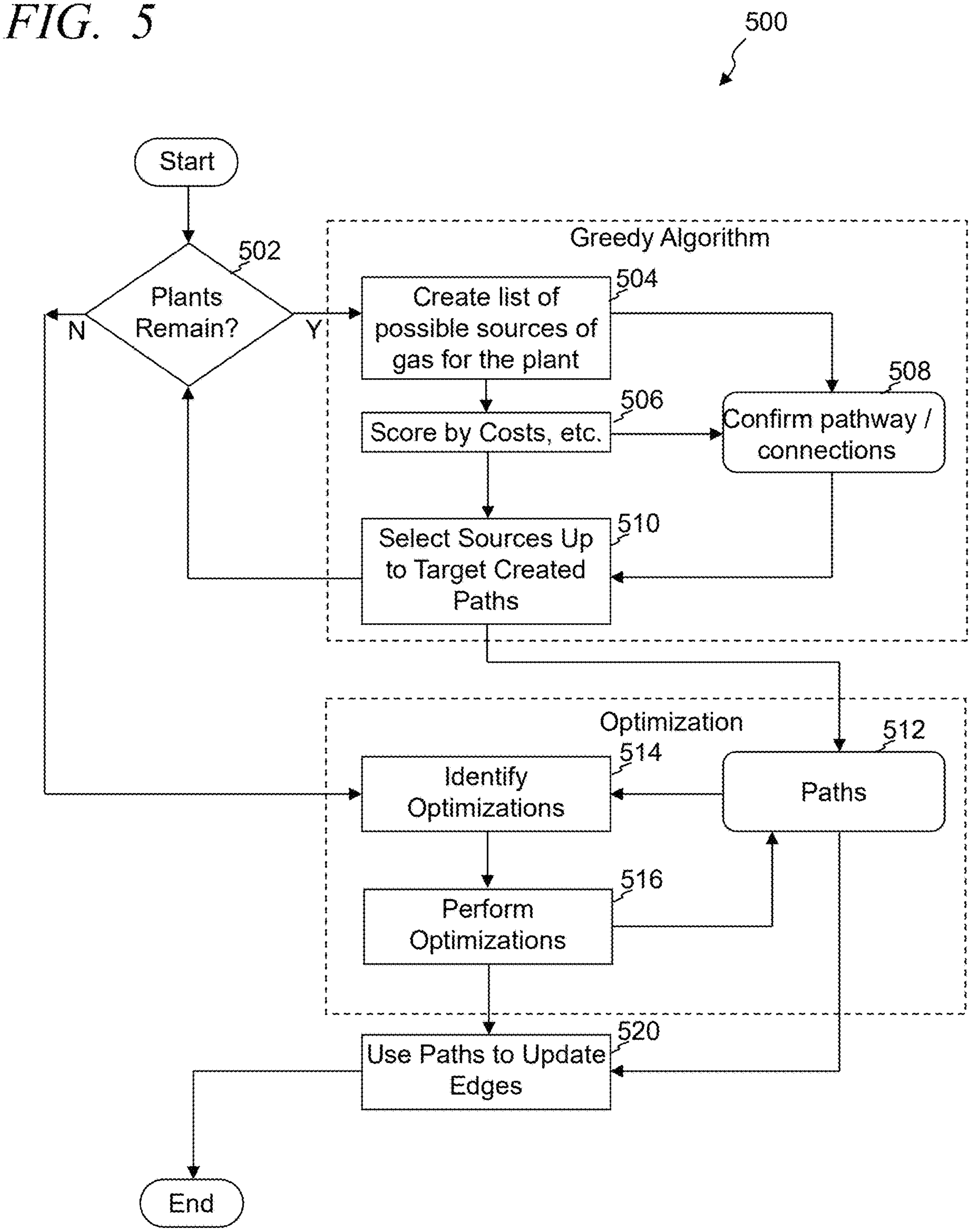
FIG. 5 illustrates a simplified flow diagram of an exemplary pipeline simulation process, in accordance with some embodiments.

FIG. 5 illustrates a simplified flow diagram of an exemplary pipeline simulation process 500, in accordance with some embodiments. This simulation process 500, in some implementations, can simulate different potential pathways that can be used to satisfy a request in determining risk levels and/or recommendation levels of the different potential pathways. Further, the simulation can identify alternatives that can attempt to improve and/or optimize one or more factors, parameters and/or risk factors associated with identifying pipeline pathways that are more beneficial to a particular scheduler and/or requestor based on real-time, current information. The optimization is not limited to cost, and instead takes into consideration several additional factors such as one or more of, but not limited to, reliability, risk, consistency, timing, ability to shift delivery times, other such factors, and typically a combination of two or more of such factors. In some embodiments, the pipeline simulation process 500 can be used as at least part of the implementation of step 320 of the scheduling process 300, which can provide alterative pathways that can be considered. The pipeline simulation process 500 can be implemented as an iterative process that can be implemented repeatedly for the same and different pathways based on varying factors in order to identify more optimized scheduling.

In FIG. 5, the process identifies gaseous resources or plants to be evaluated. When there are plants to be evaluated (i.e., there are remaining plants in step 502), the process can advance to step 504. In step 504, a listing of potential sources and/or resource providers 202 can be generated that can be used to satisfy some or all of a requested quantity to a plant being evaluated. In step 506, some embodiments optionally score the potential sources by costs, etc., e.g., based on one or more factors, such as but not limited to cost information, reliability, risk, other such factors or a combination of two or more of such factors. In step 508, some embodiments confirm viable pathways and/or connections 204 between sources and the plant. In step 510, the process can select the sources up the target created paths, e.g., to confirm that available capacity and sufficient quantities from selected one or more providers will satisfy the one or more requests being scheduled through potential pipeline pathways, and identifies relevant pathways with sufficient capacity. The identified pathways having sufficient capacity are output to pathway storage 512. After step 510, the process 500 can return to step 502 when further consuming plants are to be evaluated. Some embodiments apply one or more algorithms and/or machine learning in the evaluation as described in detail below. For example, one or more greedy algorithms, Dijkstra's algorithm, and/or other publicly available and/or proprietary algorithms can be applied relative to and/or in balancing cost relative to reliability and/or other factors. This can take into consideration primary rights to a pipeline section versus one or more pipeline sections without contract rights and/or lower priority rights. When all plants to receive gas are evaluated (e.g., there are no more remaining plants to be evaluated in step 502), the process can advance to step 514.

In step 514, optimizations are identified, e.g., one or more parameters, risk factors, timing and/or other such factors are evaluated relative to the identified potential pathways to identify potential optimizations. In some embodiments, example parameters or factors can include different quantities of a gas from a particular resource provider providing a better cost, different time of transport based on cost and/or demand providing reduced cost and/or more reliability, alternate connection based on reduced cost, time of the month relative to contract quantities, imbalances, gas market trading status, demands, weather, and/or other such variations. In step 516, potential optimizations to the identified pathways are performed. For example, in some embodiments, the identified potential optimizations are simulated to determine variations that may result in improvements relative to one or more factors while degrading one or more other factors, such as through the evaluation of risk factors, cost, timing, demand, real-time information (e.g., outages, real-time reduced capacity, maintenance, etc.) and/or other such optimization. For example, different costs may be identified for different potential paths based on demand and/or time, which can be identified, and in some instances ranked. This evaluation can include consideration of historic uses of pipeline sections, weather, predicted weather, gas trades, gaseous demand and/or other such factors that can affect a cost. The identified optimizations (step 514) and performed optimizations (step 516) can be repeated for one or more, and typically each identified potential pathway in the pathway storage 512 until complete, then the process can continue with step 520. Next, the recommended pipeline pathways (from 512) and quantities to transfer on respective pipeline pathways determined based on the optimizations and/or selected pipeline pathways can be used to update identified pipeline sections 210 or edges of the optimized pathway or pathways to potentially be scheduled (step 520), which can be applied in generating the one or more nominations. For example, some embodiments apply one or more algorithms and/or machine learning models (e.g., Dijkstra's algorithm) can be applied to identify and/or determine gas sources or plants from which the gas can be acquired. The cost can be determined for each relevant pathway, and in some instances, a total cost for each path is presented to a user. Some embodiments optimize for cost in a first evaluation, which can include gas procurement, gas loss, tariffs, etc. The evaluations and/or subsequent cycles of the evaluation can be applied to additionally or alternatively optimize one or more other factors. The process can continue the evaluation with other potential sources. Still further, some implementations may shuffle gas sources around and determine if one or more reliable and/or more cost-optimal source/sink combinations can be identified.

Figure 6:
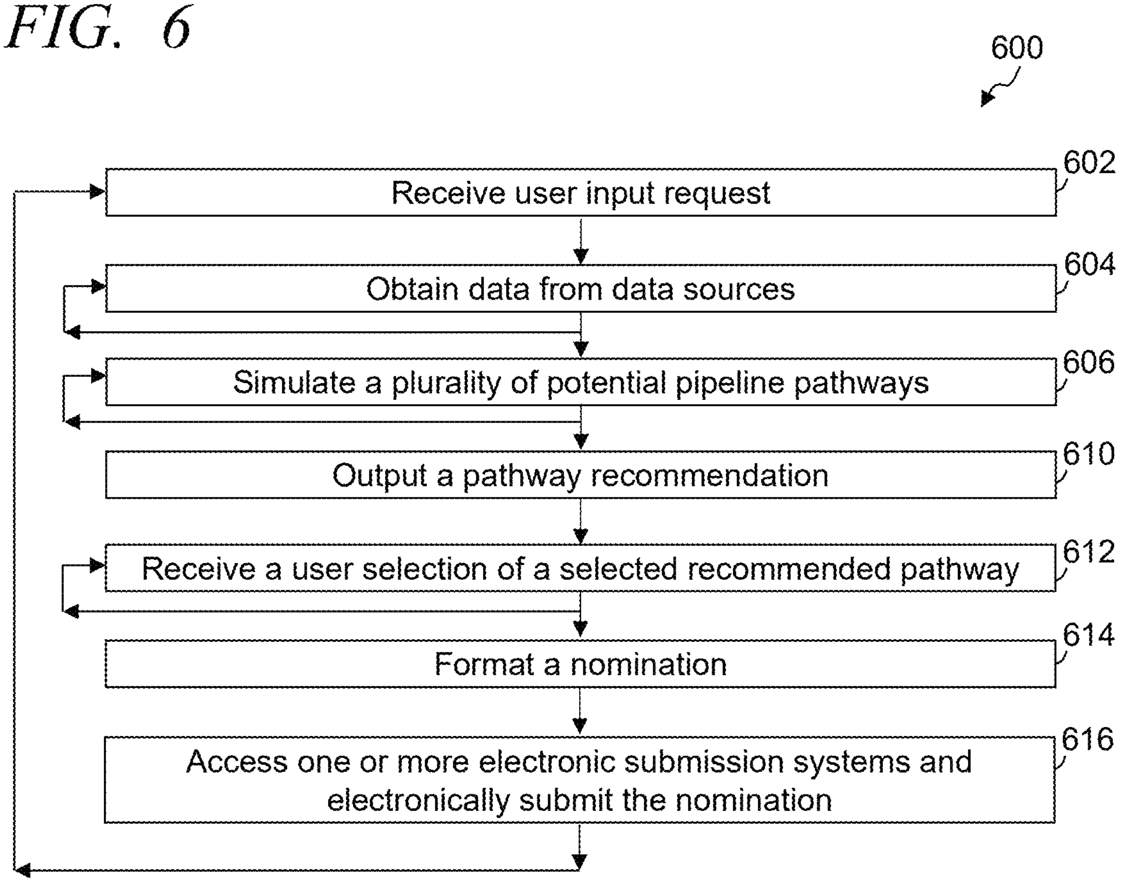
FIG. 6 illustrates a simplified flow diagram of an exemplary scheduling process, in accordance with some embodiments.

FIG. 6 illustrates a simplified flow diagram of an exemplary scheduling process 600 of scheduling gaseous resources, in accordance with some embodiments. In step 602, a user input is received, by a pathway scheduling control circuit executing a scheduling application stored on a non-transitory storage medium. The user input corresponds to a request for a gaseous resource to be distributed through a gas pipeline network 120 to a destination location at a destination time. The gas pipeline network 120 includes a network of pipeline sections 210 and connections 204, and the usage of the connections and pipeline sections is controlled by third-party entities. Further, the costs associated with distribution of the gaseous resource vary according to a plurality of factors that can be evaluated in identifying potential pathways and/or evaluating potential pathways.

In step 604, data is automatically obtained, over a distributed communications network 104, from a plurality of data sources 106. The plurality of data sources 106 can include, for example, data sources provided by the third-party entities, market sources, and environmental sources. Often, updated data can be repeatedly received over time, which can help to ensure real-time evaluations, indicated in FIG. 6 as a repetition of step 604. In step 606, a plurality of potential pathways of the gas pipeline network are automatically simulated between each of one or more gaseous resource provider 202 to the destination location to meet the request. Step 606 can be repeated for each potential pathway and/or repeated based on updated information for one or more of the pathways, indicated in FIG. 6 as a repetition of step 606. The simulation, in some embodiments, can include identifying, based on the simulation, a first risk factor corresponding to a first connection 204, of the connections, along a first potential pipeline pathway. The first risk factor can be evaluated to identify when the first risk factor has a predefined relationship with one or more corresponding risk thresholds (e.g., cost, reliability, demand, predicted demand, weather, etc.). A second gaseous resource provider can be identified that is different than the first gaseous resource provider based on the first risk factor having the predefined relationship with the first threshold. One or more additional potential pathways of the gas pipeline network between the second gaseous resource provider to the destination location to meet the request can be automatically simulated.

In step 610, a pathway recommendation is automatically outputted. The pathway recommendation, in some embodiments, can include at least a first recommended pathway of the gas pipeline network to meet the request and associated financial costs. The generation of the pathway recommendation, in some embodiments, can include incorporating a listing of multiple different potential pathways. For example, a first recommended pathway along with first explanation data explaining reasoning for recommending the first recommended pathway and comprising a first pathway score, an estimated first cost and a first set of one or more risk factors, wherein the first pathway score is based on the estimated first cost and the first set of one or more risk factors, and a second recommended pathway with second explanation data explaining reasoning for recommending the second recommended pathway and comprising a second pathway score, an estimated second cost and a second set of one or more risk factors, wherein the second pathway score is based on the estimated second cost and the second set of one or more risk factors.

In some embodiments, the pipeline pathway scheduling system 102 can control a user computing system 124 to render a recommendation graphical user interface that comprises the pathway recommendation that can include a listing of the first recommended pathway and an additional recommended pathway, and render in association with the recommended pathway the associated financial costs corresponding to two or more sections of the first recommended pathway each operated by a different one of the third-party entities, and associated alternate financial costs corresponding to two or more alternate sections of the additional recommended pathway each operated by a different one of the third-party entities. Some embodiments, in generating the pathway recommendation, identify, based on the simulation, a first risk factor corresponding to a first connection (e.g., connection 204*b*), of the connections, along a first pipeline pathway, and identify that the first risk factor has a predefined relationship with a risk threshold. In generating the pathway recommendation, the pipeline pathway scheduling system 102 can include generating a listing of two or more different potential pathways comprising the first recommended pathway along with first explanation data explaining reasoning for recommending the first recommended pathway and comprising a notification of the first risk factor corresponding to the first connection having the predefined relationship with the first threshold, and a first additional recommended pathway, of the plurality of additional potential pathways, and additional explanation data explaining reasoning for recommending the first additional recommended pathway.

Still referring to FIG. 6, in step 612, a user selection of a selected recommended pathway from the pathway recommendation is received. Step 612 may be repeated when one or more additional pathways are selected, such as when two or more pathways are selected to satisfy a single request, when multiple requests are being evaluated, and/or other such instances, indicated in FIG. 6 as a repetition of step 612. In step 614, a nomination is automatically formatted for the selected recommended pathway including all formal requirements of each of one or more of the third-party entities each controlling a portion of the gas pipeline network establishing the selected recommended pathway. In step 616, one or more separate electronic submission systems can be automatically accessed, via the distributed communications network 104, and controlled to electronically submit the nomination of the selected recommended pathway for the request for the gaseous resource to the electronic submission system for execution.

Figure 7:
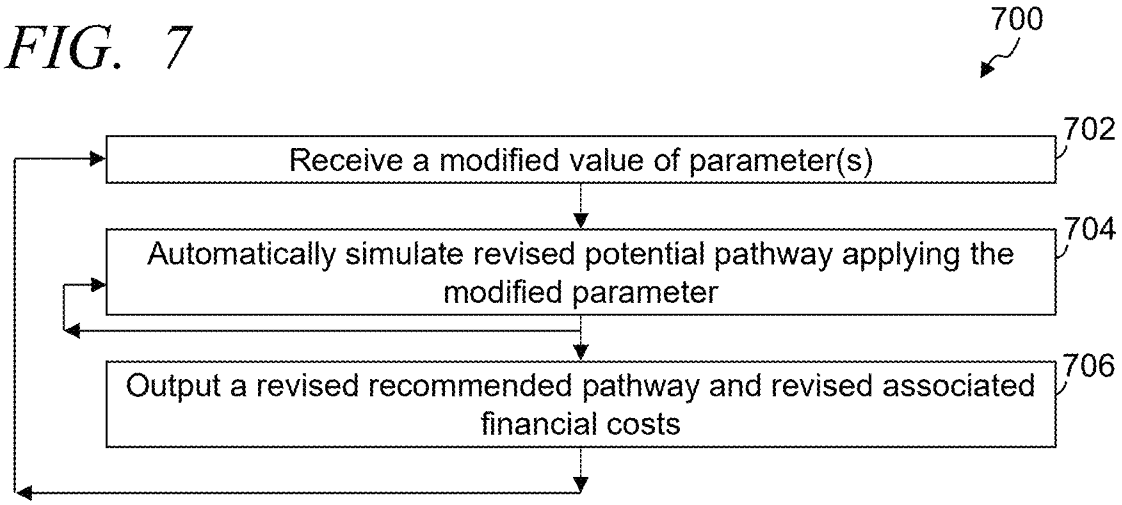
FIG. 7 illustrates a simplified flow diagram of an exemplary reevaluation process of re-simulating one or more potential pipeline pathways, in accordance with some embodiments.

FIG. 7 illustrates a simplified flow diagram of an exemplary reevaluation process 700 of re-simulating one or more potential pipeline pathways, in accordance with some embodiments. The process 700, may, for example, be implemented as part of and/or following step 606, and/or may be implemented following step 612 and/or step 614 to obtain revised recommended pathways based on received modifications. In step 702, a modified value of a first parameter of a plurality of parameters applied during a simulation and/or re-simulation can be received, for example, from a user through user computing system 124. Typically, the modified value is received following a simulation or re-simulation and in response to outputting a recommended pathway of the gas pipeline network. In step 704, at least one revised potential pathway of the gas pipeline network, between the first gaseous resource provider to the destination location to meet the request, is automatically simulated while applying the modified value of the first parameter. Step 704 may be repeated for a pathway based on one or more further revisions and/or other revised potential pathways, indicated in FIG. 7 as a repetition of step 704. In step 706, a revised recommended pathway and revised associated financial costs can automatically be outputted based on the plurality of potential pathways and the revised potential pathway. In some embodiments, a revised pathway recommendation comprising a listing of one or more recommended pathways can be outputted that includes one or more revised recommended pathways based on at least the modified value.

Figure 8:
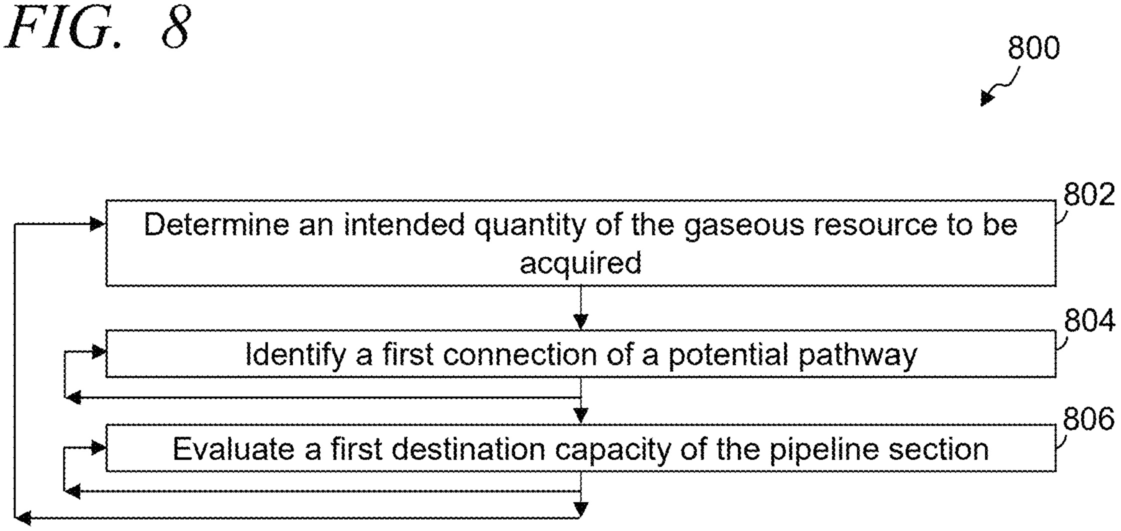
FIG. 8 illustrates a simplified flow diagram of an exemplary process of identifying potential pipeline pathways, in accordance with some embodiments.

FIG. 8 illustrates a simplified flow diagram of an exemplary process 800 of identifying potential pipeline pathways, in accordance with some embodiments. The process 800 can, in some embodiments, be implemented as at least part of step 606. In step 802, an intended quantity of the gaseous resource to be acquired from the first gaseous resource provider is determined. In step 804, a first connection is identified of a first potential pathway, and a first pipeline section directly, fluidly coupled with the first connection is identified. In step 806, a first destination capacity of the first pipeline section can be evaluated relative to the intended quantity in the request to confirm that the pipeline first destination capacity is sufficient to satisfy the intended capacity. The process 800 can repeat steps 804 and 806 to repeatedly identify one or more additional connections each fluidly coupled with a respective additional pipeline section, of the first potential pathway, that each have respective destination capacities equal to or greater than the intended quantity, e.g., indicated in FIG. 8 as a repetition of steps 804 and 806. Accordingly, the first potential pathway can be confirmed to satisfy the request and can comprise the first connection and first pipeline section, and each of the one or more additional connections and the respective additional pipeline sections.

Figure 9:
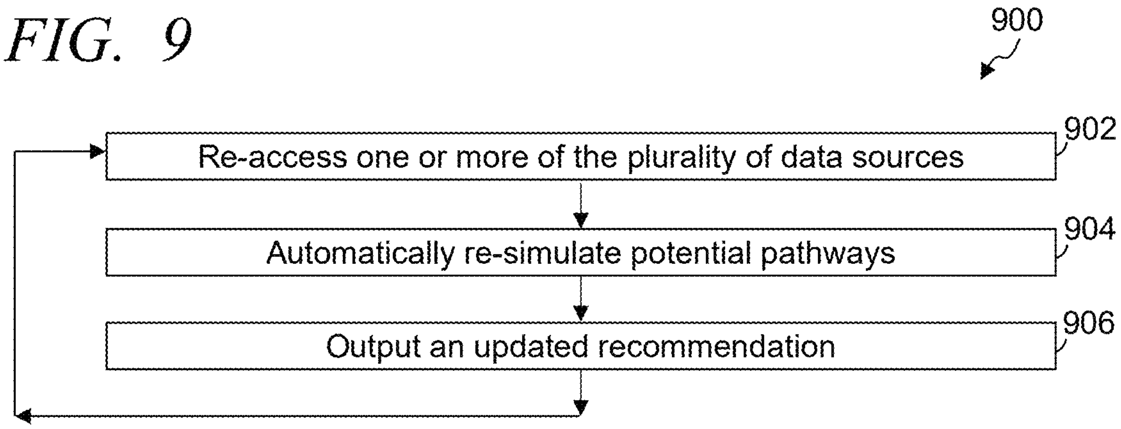
FIG. 9 illustrates a simplified flow diagram of an exemplary re-simulation process of re-simulating one or more recommended and/or potential pipeline pathways, in accordance with some embodiments.

FIG. 9 illustrates a simplified flow diagram of an exemplary re-simulation process 900 of re-simulating one or more recommended and/or potential pipeline pathways, in accordance with some embodiments. The re-simulation process 900 can be implemented, for example, following step 606 and/or following any one of steps 610, 612, 614, and/or 616 of the of the scheduling process 600. In step 902, at least one of the plurality of data sources 106 can automatically be re-accessed, at a later period of time following the user selection of the selected recommended pathway and after the formatting of the nomination, to obtain real-time current data, from the at least one of the plurality of data sources, corresponding to a selected recommended pathway.

In step 904, the process can automatically re-simulate two or more of the plurality of potential pathways based on the retrieved real-time current data. In step 906, an updated recommendation can be automatically outputted that comprises an updated recommended pathway of the gas pipeline network to meet the request and associated financial costs based on the re-simulation.

Figure 10:
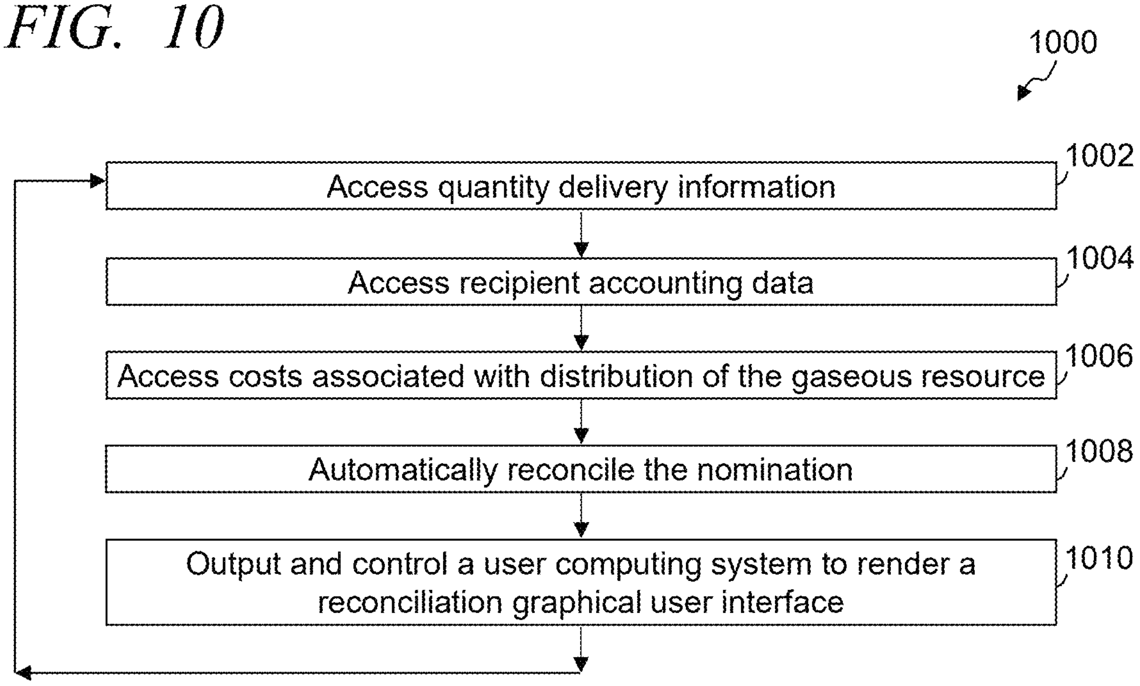
FIG. 10 illustrates a simplified flow diagram of an exemplary reconciliation process, in accordance with some embodiments.

FIG. 10 illustrates a simplified flow diagram of an exemplary reconciliation process 1000, in accordance with some embodiments. In step 1002, quantity delivery information can be automatically accessed, via the distributed communications network 104 and following delivery of the gaseous resource via the selected recommended pathway, from one or more of the third-party entities controlling at least a pipeline section of the selected recommended pathway. The quantity delivery information, in some embodiments, specifies a quantity of gaseous resource intended to be supplied through the respective pipeline section. In step 1004, the process can automatically access, via the distributed communications network 104, recipient accounting data from an intended recipient of the request comprising a determined delivered quantity of the gaseous resource received by the intended recipient. In step 1006, costs associated with distribution of the gaseous resource of the nomination can be automatically accessed.

In step 1008, the nomination is automatically reconciled at least in part by determining when there are one or more variations or inconsistencies between the nomination and each of the quantity delivery information, the determined delivered quantity of the gaseous resource, and the accessed costs associated with distribution of the gaseous resource of the nomination. In step 1010, a user computing system 124 can be controlled in rendering on a display a reconciliation graphical user interface comprising the one or more variations between the nomination and each of the quantity delivery information, the determined delivered quantity of the gaseous resource, and the accessed costs associated with distribution of the gaseous resource of the nomination.

As described above, some embodiments utilize one or more trained machine learning models (which are retrained over time based on feedback) and/or other such methods, or a combination of two or more of such methods. For example, some embodiments utilize one or more machine learning models and/or generative artificial intelligence (AI) that can be trained and retrained over time with one or more corpuses of information and/or feedback. Still further, some embodiments utilize artificially generated training and/or re-training data. Such data can be generated based on historic pipeline scheduling, hypothetical pipeline scheduling and/or other information. The training data can be dependent on the type of machine learning model or models employed. The machine learning models and/or modeling applications further include the trained, deep learning models that process the data. The learning models can be substantially any relevant modeling, whether custom developed or acquired by a third-party. For example, in some embodiments, the trained learning models may include decision trees, XGBOOST, GRIDSEARCHCV, unsupervised learning, regression, clustering, TENSORFLOWLITE model, MOBILENETV2 model, ML KIT for FIREBASE, and substantially any other relevant modeling and supporting applications (e.g., CORE ML, VISION FRAMEWORK, CAFFE, KERAS, XGBOOST, TENSORFLOW, etc.) to implement the modeling. Additionally or alternatively, the machine learning models can comprise a neural network machine learning model, a convolutional neural network, Bayesian network learning, dynamically learned behavior based on, for example, decision tree learning, association rule learning, inductive logic learning, support vector learning, cluster analysis learning, Bayesian network learning, and/or similarity and metric learning, and/or other such modeling.

The pipeline scheduling and control system 100, in some embodiments, reduces computational processing, reduces computation time, and optimizes gas paths and costs. The system runs potential pipeline simulations and generates recommendations that can provide various optimizations for different factors. Further, the system 100 enables a user to vary simulation parameters for updated recommendations. Information is gathered from a variety of sources, including information relating to availability and cost/tariff data from each of the potential traders, pipeline operators, and/or other entities, to identify multiple potential pipeline sections that can be used to transport the gas from a provider/trader to an intended destination. Simulations can be performed that can further take into consideration cost, supply and demand data, environmental data (weather) that may impact the decision, and other data. The scheduling process can scrape websites and services of the multiple different data sources 106 to obtain relevant data to enable consideration of real-time data and changes to such data, which enables re-evaluation over time.

Some embodiments provide an automated simulation process to run multiple simulations using different combinations of providers, times, pipeline pathways, parameters, and/or other such factors, to generate pipeline suggestions and/or recommendations for an optimal recommended trade. The simulations, in some embodiments, can be based on graph theory and customizable parameters and/or priorities. The simulation process presents the user with a recommendation for pipeline scheduling with one or more recommended pipeline pathways with relevant explanation information. In some cases, it provides multiple recommended potential pipeline schedules with different characteristics and/or aspects (e.g., risk level, cost, timing variations, etc.). The simulations process has access to a large volume of data in real-time enabling re-evaluations and recommendations based on the most current conditions and factors, such as unplanned outages, changes in demand, notifications from traders, and other relevant factors that can change on short notice. A user can review the recommendation and accept it (or accept one of multiple recommendations). Alternatively, the user can modify one or more factors, variables, prioritizes and/or one or more other aspects, and the simulation process updates one or more recommendations. The system can include the nomination generation system 110 that utilizes selected one or more recommended pathways to generate one or more nominations and automate the control of one or more electronic submission systems to automatically enter relevant data formatted for the submission to the respective electronic submission systems.

The evaluation and pipeline scheduling often spans multiple days. For example, the pipeline pathway scheduling system can recommend potential pipeline pathways, with one or more pathways being scheduled for a subsequent day, such as the next day. During one or more subsequent days following the scheduling, the pipeline pathway scheduling system can re-evaluate one or more pathways, such as through the reevaluation process 700 based on one or more modifications and/or the exemplary re-simulation process 900 over one or more following days. Some embodiments maintain one or more simulation and/or nomination databases, spreadsheets, workbooks and/or other such methods of maintaining relevant information that is utilized by one or more components and/or sub-components of the automated pipeline scheduling and control system 100. Further, some embodiments enable communications from the pipeline pathway scheduling system 102 with one or more third-party systems to acquire relevant information and/or updated information. Still further, the pipeline pathway scheduling system may receive inputs from one or more users based on communications between the pipeline scheduling entity and the one or more third-party entities (e.g., resource providers, pipeline second control entities, etc.). For example, some embodiments obtain identification information (e.g., contract number (K), DUNNS number, etc.) and/or other information that can be used in populating one or more nominations to be inputted to one or more electronic submission systems 114.

Further, some embodiments maintain one or more spreadsheets, databases, workbooks and/or other such methods to maintaining reconciliation information. For example, one or more monthly spreadsheets may be maintained storing pipeline scheduling information and/or corresponding actual transfer information (e.g., spot deals and contract totals). The pipeline pathway scheduling system 102 may further include and/or access one or more applications executable to perform portions of the evaluations, simulations, confirmations and/or other such processing.

The automated pipeline scheduling and control system 100 provides a technological platform to automatically simulate and generate nominations of gas scheduling based on gas trades. The nomination generation system 110, in some embodiments, provides a nomination graphical user interface that can allow a user to view automatically generated nominations, override one or more aspects, alter one or more aspects, and/or approve a nomination before and/or after a nomination is used to post the pipeline scheduling to one or more electronic submission systems 114. The simulations, in some embodiments, utilize graph theory, and a no-code priority list that is customizable. A recommendation can be generated that can automatically select one or more pathways for a given request, and/or can enable a human scheduler to select and/or override one or more pipeline pathways of interest. Based on the selected one or more pipeline pathways, the nomination generation system can generate a nomination. Some embodiments implement one or more algorithms, electronic data interchange (EDI) models, machine learning modes for upload to one or more electronic submission systems. The automated pipeline scheduling and control system 100 can further anticipate and/or avoid cuts, imbalances, and/or other pipeline potential problems. Further, some embodiments include the reconciliation system 112 that can provide invoice reconciliation at the end of each cycle. The system operates in real-time and can reassess parameters, pipeline sections, connections, demand, updates, data from various sources (e.g., EBB Pipeline Data (Allocations, Maintenance/Outage), pricing, expected gas burn, etc.) to refresh recommendations. This refresh can occur based on a schedule, at predefined periods of time (e.g., at each of 4 cycles throughout the day), in response to detecting and/or receiving a notification of a change and/or threshold change, and/or other such instances. The automated pipeline scheduling and control system 100 improves efficiency of pipeline scheduling, reduces costs, while improving computation processing.

Further, the automated pipeline scheduling and control system 100 can simulate gas pathways to allow optimized automated decisions, and provide enhanced recommendations to streamline human decisions when input is beneficial. The system can implement customizable priority listings to allow for optimization using graph theory (e.g., node/edge). The nomination generation system 110 can automate the generation of nominations and control electronic submission systems to submit the pipeline schedules. The scheduling directs the control of sections of the pipeline network to execute the scheduled gaseous transfer. Further, some embodiments execute the reconciliation system 112 to automate reconciliation on cuts, imbalances, costs, accounting invoices and/or other potential inconsistencies. The automated pipeline scheduling and control system 100, in some embodiments, tracks data to provide daily/monthly record keeping, minimizing manual entry, while optimizing access to relevant information.

Figure 11:
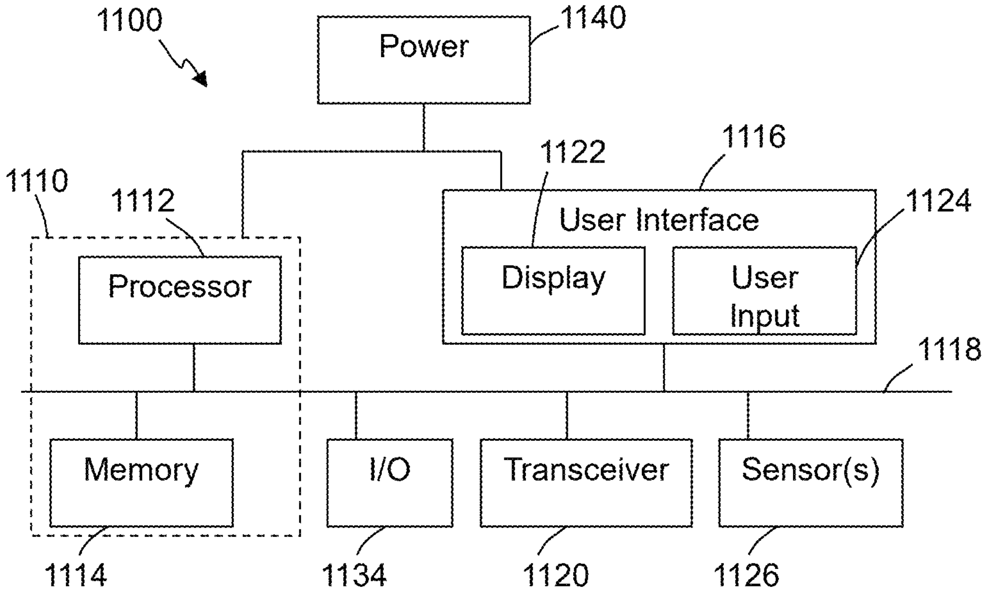
FIG. 11 illustrates an exemplary system for use in implementing methods, techniques, devices, apparatuses, systems, servers, sources and providing pipeline simulation, scheduling and control of gas transport through a pipeline network, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 11 illustrates an exemplary system 1100 that may be used for implementing any of the components, circuits, circuitry, systems, functionality, apparatuses, processes, or devices of pipeline scheduling and control system 100, and/or other above or below mentioned systems or devices, or parts of such circuits, circuitry, functionality, systems, apparatuses, processes, or devices. For example, the system 1100 may be used to implement some or all of the structure pathway analysis, control and communication systems 105, the pipeline pathway scheduling system 102, the pipeline pathway simulation system 108, the nomination generation system 110, the reconciliation system 112, and/or other such components, circuitry, functionality and/or devices. However, the use of the system 1100 or any portion thereof is certainly not required.

By way of example, the system 1100 may comprise one or more processor modules or control circuits 1112, one or more memory 1114, and one or more communication links 1118, paths, buses or the like. Some embodiments may include one or more user interfaces 1116, and/or one or more internal and/or external power sources or supplies 1140. The control circuit 1112 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1112 can be part of control circuitry and/or a control system 1110, which may be implemented through one or more processors with access to one or more memory 1114 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1100 may be used to implement one or more of the above or below, or parts of, components, circuits, systems, processes and the like.

The user interface 1116 can allow a user to interact with the system 1100 and receive information through the system. In some instances, the user interface 1116 includes a display 1122 and/or one or more user inputs 1124, such as buttons, touch screen, track ball, keyboard, mouse, etc., which can be part of or wired or wirelessly coupled with the system 1100. Typically, the system 1100 further includes one or more communication interfaces, ports, transceivers 1120 and the like allowing the system 1100 to communicate over a communication bus, a distributed computer and/or communication network 104 (e.g., a local area network (LAN), the Internet, wide area network (WAN), etc.), communication link 1118, other networks or communication channels with other devices and/or other such communications or combination of two or more of such communication methods. Further the transceiver 1120 can be configured for wired, wireless, optical, fiber optical cable, satellite, or other such communication configurations or combinations of two or more of such communications. Some embodiments include one or more input/output (I/O) ports 1134 that allow one or more devices to couple with the system 1100. The I/O ports can be substantially any relevant port or combinations of ports, such as but not limited to USB, Ethernet, or other such ports. The I/O interface 1134 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1126 to provide information to the system and/or sensor information that is communicated to another component. The sensors can include substantially any relevant sensor, such as pressure sensors, flow sensors, leak sensors, and/or other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1100 comprises an example of a control and/or processor-based system with the control circuit 1112. Again, the control circuit 1112 can be implemented through one or more processors, controllers, central processing units, logic, software and the like. Further, in some implementations the control circuit 1112 may provide multiprocessor functionality.

The memory 1114, which can be accessed by the control circuit 1112, typically includes one or more processor-readable and/or computer-readable media accessed by at least the control circuit 1112, and can include volatile and/or nonvolatile media, such as RAM, ROM, EEPROM, flash memory and/or other memory technology. Further, the memory 1114 is shown as internal to the control system 1110; however, the memory 1114 can be internal, external or a combination of internal and external memory. Similarly, some or all of the memory 1114 can be internal, external or a combination of internal and external memory of the control circuit 1112. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 104. The memory 1114 can store code, software, executables, scripts, data, content, lists, programming, programs, log or history data, user information, customer information, product information, and the like. While FIG. 11 illustrates the various components being coupled together via a bus, it is understood that the various components may actually be coupled to the control circuit and/or one or more other components directly.

In some embodiments, the pipeline pathway simulation system 108 applies graph theory to set a series of connections and pipeline sections or edges in defining a recommended pathway to transmit gas within a constrained system. Some embodiments apply algorithms and/or equations based on part on infrastructure that limits variations in routing the gas between one or more sources to an intended destination, and/or limited flexibilities in costs of the respective sections of pipeline. Other embodiments, however, apply a tiering and/or establish a prioritization of the different potential pipeline sections of the one or more potential routes between the one or more sources and the intended destination, based in part on an optimization of economic factors and/or resulting total cost relative to at least timing to meet one or more demands of the intended recipient at the intended destination. These simulations can take into consideration different parameters, which may be user adjustable, and restrictions. Further, the simulations can apply pipeline constraints (e.g., gas volume constraints, availability constraints, gas losses constraints, pipeline section connectivity and/or routing constraints, other such constraints, and typically a combination of two or more of such constraints), limits on where and/or which pipeline sections that gas can flow, intended destination, potential intended node locations (e.g., one or more intermediate destination nodes that are preferred and/or required along a potential total pathway), and/or other such factors. The simulation accesses various data sources and/or databases to obtain real-time current information regarding the different pipeline sections.

Further, in some embodiments, a user interface enables the user to set and/or adjust one or more constraints (e.g., specify values, on/off, etc.) and/or specify priorities of one or more conditions. The simulation can apply these user specified settings and/or priorities in simulating and/or re-simulating different potential pipeline pathways, the timing and the economic factors in identifying one or more recommended gas flow schedules. The resulting one or more recommendations can be presented to the user. The parameters, constraints and/or other such factors utilized in the simulation can also be made available to the user, and/or the user through the user interface can make modifications to one or more of these parameters, constraints and/or other such factors and initiate revised simulations resulting in one or more revised recommended pipeline pathways or flow schedules based on the modifications. Further, in some embodiments, the system can present different recommended pipeline pathways and/or revised recommended pipeline pathways side by side through a GUI, and/or highlight differences between two or more recommended pipeline pathways and/or revised recommended pipeline pathways.

The recommended pipeline pathways and/or revised recommended pipeline pathways can be considered by one or more users in confirming desired parameters, conditions and/or other factors. Some modifications of the one or more parameters, conditions and/or other factors can be applied globally to the entire simulation, while other modifications may be specific to one or more pipeline sections 210, one or more pipeline connections 204, one or more times of day, and the like, enabling the user to make broad and/or specific adjustments to the simulation. As one non-limiting example, a user may know they want to avoid a particular sub-path, and the user can select to avoid that particular sub-path. Similarly, as an other non-limiting example, a user can force the overall path to include one or more particular connections, pipeline sections and/or sub-paths. Still further, a user can set one or more cost or tariff thresholds, adjust timing, and/or other such modifications.

The recommended pipeline pathways and/or recommended schedules may vary, such as a most conservative risk adverse recommendation, a conservative recommendation, a more risk tolerant recommendation (e.g., mild day that may allow for a selection of a path and/or a tariff that may not flow without one or more adverse effects) that may be less costly, and/or other such variations in the recommended pipeline pathways. Again, typically the user can view the different constraints, parameters and/or factors utilized by the simulations in order to better evaluate the one or more recommended schedules and/or make modifications to obtain revised recommendations. Additionally, because the system accesses real-time data, different simulations implemented at different times may results in different recommendations based on updated information available at the times of the simulations and/or re-simulation (e.g., changes in pipeline availability and/or outages, increase/decrease in tariff, etc.).

Similarly, the simulations can take into consideration data from third parties and/or real-time data, such as but not limited to maintenance schedules, unplanned outages, expected durations of conditions, and/or other such factors and/or conditions that may change over time with or without notice. As described above and further below, the real-time information can be obtained through the scraping of third-party websites, access to third-party databases, notifications from third parties (e.g., emails, text messages, postings on message electronic message boards, etc.), and/or other such methods and/or sources. Such automation provides enhances processing and reduces the computation processing by in part limiting processing to more relevant aspects of the simulation while avoiding simulations based on factors that are no longer relevant, beyond one or more thresholds and/or unavailability. In some embodiments, the system automates the evaluation and can notify the user of potential real-time changes and/or resulting modifications to recommended schedules based on changing conditions and/or factors.

In some embodiments, the system enables the user to override a recommended schedule. Similarly, through the ability to adjust parameters, conditions and/or other such factors, the user can provide at least some control over the simulation and resulting one or more recommended schedules provided.

Some embodiments provide systems for scheduling gaseous resources over a physical gas pipeline network comprising: a control circuit; an application stored on a non-transitory storage medium and executable by the control circuit, wherein when executed, the application is configured to: receive a user input corresponding to a request for a gaseous resource to be distributed through the physical gas pipeline network to a destination location at a destination time, wherein the gas pipeline network comprises a network of physical pipes and connections usage of which is controlled by third-party entities and costs associated with distribution of the gaseous resource vary according to a plurality of factors; automatically obtain, over the distributed communications network, data from a plurality of data sources, the plurality of data sources including data sources provided by the third-party entities, market sources, and environmental sources; automatically simulate a plurality of potential pathways of the gas pipeline network between a first gaseous resource provider to the destination location to meet the request; automatically output a pathway recommendation comprising at least a first recommended pathway of the gas pipeline network to meet the request and associated financial costs; receive a user selection of a selected recommended pathway from the pathway recommendation; automatically format a nomination for the selected recommended pathway including all formal requirements of each of one or more of the third-party entities each controlling a portion of the gas pipeline network establishing the selected recommended pathway; and automatically access, via the distributed communications network, and control a separate electronic submission system and electronically submit the nomination for the request for the gaseous resource to the electronic submission system for execution.

Some embodiments provide methods for scheduling gaseous resources over a physical gas pipeline network comprising: receiving, by a control circuit executing a scheduling application stored on a non-transitory storage medium, a user input corresponding to a request for a gaseous resource to be distributed through the physical gas pipeline network to a destination location at a destination time, wherein the physical gas pipeline network comprises a network of pipes and connections usage of which is controlled by third-party entities and costs associated with distribution of the gaseous resource vary according to a plurality of factors; automatically obtaining, over a distributed communications network, data from a plurality of data sources, the plurality of data sources including data sources provided by the third-party entities, market sources, and environmental sources; automatically simulating a plurality of potential pathways of the physical gas pipeline network between a first gaseous resource provider to the destination location to meet the request; automatically outputting a pathway recommendation comprising at least a first recommended pathway of the physical gas pipeline network to meet the request and associated financial costs; receiving a user selection of a selected recommended pathway from the pathway recommendation; automatically formatting a nomination for the selected recommended pathway including all formal requirements of each of one or more of the third-party entities each controlling a portion of the physical gas pipeline network establishing the selected recommended pathway; and automatically accessing, via the distributed communications network, and controlling a separate electronic submission system and electronically submitting the nomination for the request for the gaseous resource to the electronic submission system for execution.

Some embodiments provide a system for physical pipeline analysis and control of gaseous resource scheduling comprising: a server or computer-based computing system comprising a control circuit that cooperatively operates with a distributed communications network; an application stored on a non-transitory storage medium and executable by the control circuit, wherein when executed, the application is configured to: receive a user input corresponding to a request for a gaseous resource to be distributed through a physical gas pipeline network to a destination location at a destination time, wherein the gas pipeline network comprises a network of physical pipes and connections usage of which is controlled by third-party entities and costs associated with distribution of the gaseous resource vary according to a plurality of factors; automatically obtain, over the distributed communications network, data from a plurality of data sources, the plurality of data sources including data sources provided by the third-party entities, market sources, and environmental sources; automatically simulate a plurality of potential pathways of the gas pipeline network between a first gaseous resource provider to the destination location to meet the request; automatically output a pathway recommendation comprising at least a first recommended pathway of the gas pipeline network to meet the request and associated financial costs; receive a user selection of a selected recommended pathway from the pathway recommendation; automatically format a nomination for the selected recommended pathway including all formal requirements of each of one or more of the third-party entities each controlling a portion of the gas pipeline network establishing the selected recommended pathway; and automatically access, via the distributed communications network, and control a separate electronic submission system and electronically submit the nomination for the request for the gaseous resource to the electronic submission system for execution.

Some embodiments provide methods for physical pipeline analysis and control of gaseous resource scheduling comprising: receiving, server or computer-based computing system communicatively coupled via a distributed communications network and executing a scheduling application stored on a non-transitory storage medium, a user input corresponding to a request for a gaseous resource to be distributed through a gas pipeline network to a destination location at a destination time, wherein the gas pipeline network comprises a network of physical pipes and connections usage of which is controlled by third-party entities and costs associated with distribution of the gaseous resource vary according to a plurality of factors; automatically obtaining, over the distributed communications network, data from a plurality of data sources, the plurality of data sources including data sources provided by the third-party entities, market sources, and environmental sources; automatically simulating a plurality of potential pathways of the gas pipeline network between a first gaseous resource provider to the destination location to meet the request; automatically outputting a pathway recommendation comprising at least a first recommended pathway of the gas pipeline network to meet the request and associated financial costs; receiving a user selection of a selected recommended pathway from the pathway recommendation; automatically formatting a nomination for the selected recommended pathway including all formal requirements of each of one or more of the third-party entities each controlling a portion of the gas pipeline network establishing the selected recommended pathway; and automatically accessing, via the distributed communications network, and controlling a separate electronic submission system and electronically submitting the nomination for the request for the gaseous resource to the electronic submission system for execution.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. A system for physical pipeline analysis and control of gaseous resource scheduling comprising:

a server or computer-based computing system comprising a control circuit that cooperatively operates with a distributed communications network; and an application stored on a non-transitory storage medium and executable by the control circuit, wherein when executed, the application is configured to:

receive a user input corresponding to a request for a gaseous resource to be distributed through a physical gas pipeline network to a destination location at a destination time, wherein the gas pipeline network comprises a network of physical pipes and connections, usage of which is controlled by third-party entities and costs associated with distribution of the gaseous resource vary according to a plurality of factors;

automatically obtain, over the distributed communications network, data from a plurality of data sources, the plurality of data sources including data sources provided by the third-party entities, market sources, and environmental sources;

automatically simulate a plurality of potential pathways of the gas pipeline network between a first gaseous resource provider to the destination location to meet the request;

automatically output a pathway recommendation comprising at least a first recommended pathway of the gas pipeline network to meet the request and associated financial costs;

receive a user selection of a selected recommended pathway from the pathway recommendation;

automatically format a nomination for the selected recommended pathway including all formal requirements of each of one or more of the third-party entities each controlling a portion of the gas pipeline network establishing the selected recommended pathway; and automatically access, via the distributed communications network, and control a separate electronic submission system and electronically submit the nomination for the request for the gaseous resource to the electronic submission system for execution.

2. The system of claim 1, wherein the control circuit when executing the application is further configured to:

receive, in response to outputting the pathway recommendation, a modified value of a first parameter of a plurality of parameters applied during the initial simulation;

automatically simulate at least one revised recommended pathway of the gas pipeline network between the first gaseous resource provider to the destination location to meet the request that applies the modified value of the first parameter; and automatically output the at least one revised recommended pathway and revised associated financial costs based on the plurality of potential pathways and the revised recommended pathway.

3. The system of claim 1, wherein the control circuit is further configured to automatically identify the plurality of potential pathways comprising:

obtain an intended quantity of the gaseous resource to be acquired from the first gaseous resource provider;

identify a first connection of a first potential pathway, and a first pipeline section directly, fluidly coupled with the first connection;

confirm a first destination capacity of the first pipeline section relative to the intended quantity; and repeatedly identify one or more additional connections each fluidly coupled with a respective additional pipeline section of the first potential pathway that each have respective destination capacities equal to or greater than the intended quantity;

wherein the first potential pathway comprises the first connection and the first pipeline section, and each of the one or more additional connections and the respective additional pipeline sections.

4. The system of claim 1, wherein the control circuit is further configured to generate the pathway recommendation that incorporates a listing of multiple different potential pathways comprising:

the first recommended pathway along with first explanation data explaining reasoning for recommending the first recommended pathway and comprising a first pathway score, an estimated first cost and a first set of one or more risk factors, wherein the first pathway score is based on at least the estimated first cost and the first set of one or more risk factors; and a second recommended pathway with second explanation data explaining reasoning for recommending the second recommended pathway and comprising a second pathway score, an estimated second cost and a second set of one or more risk factors, wherein the second pathway score is based on at least the estimated second cost and the second set of one or more risk factors.

5. The system of claim 1, wherein the control circuit when executing the application is further configured to:

automatically re-access, at a later period of time following the formatting of the nomination, at least one of the plurality of data sources, and obtain real-time current data, from the at least one of the plurality of data sources, corresponding to the selected recommended pathway;

automatically re-simulate two or more of the plurality of potential pathways based on the real-time current data; and automatically output an updated recommendation comprising an updated recommended pathway of the gas pipeline network to meet the request and associated financial costs based on the re-simulation.

6. The system of claim 1, further comprising:

a reconciliation control circuit communicatively coupled with a user computing system over the distributed communications network, wherein the reconciliation control circuit when executing a reconciliation application, following delivery of the gaseous resource via the selected recommended pathway, is configured to:

automatically access, via the distributed communications network, quantity delivery information from one or more of the third-party entities controlling at least one pipeline section of the selected recommended pathway, wherein the quantity delivery information specifies a quantity of the gaseous resource intended to be supplied through the respective pipeline section;

automatically access, via the distributed communications network, recipient accounting data from an intended recipient of the request comprising a determined delivered quantity of the gaseous resource received by the intended recipient;

automatically access the costs associated with distribution of the gaseous resource of the nomination;

automatically reconcile the nomination in determining when there are one or more variations between the nomination and each of the quantity delivery information, the determined delivered quantity of the gaseous resource, and the accessed costs associated with distribution of the gaseous resource of the nomination; and control the user computing system to render a graphical user interface configured to display the one or more variations between the nomination and each of the quantity delivery information, the determined delivered quantity of the gaseous resource, and the accessed costs associated with distribution of the gaseous resource of the nomination.

7. The system of claim 1, wherein the control circuit when executing the application is further configured to:

control a user computing system to render on a display a graphical user interface that comprises the pathway recommendation comprising a listing of the first recommended pathway and an additional recommended pathway, and render in association with the first recommended pathway the associated financial costs corresponding to two or more pipeline sections of the first recommended pathway each operated by a different one of the third-party entities, and associated alternate financial costs corresponding to two or more pipeline sections of the additional recommended pathway each operated by a different one of the third-party entities.

8. The system of claim 7, wherein the control circuit when executing the application is further configured to:

identify, based on the simulation, a first risk factor corresponding to a first connection along a first pipeline pathway; and identify that the first risk factor has a predefined relationship with a risk threshold;

wherein the pathway recommendation comprises a listing of two or more different potential pathways comprising:

the first recommended pathway along with first explanation data explaining reasoning for recommending the first recommended pathway and comprising a notification of the first risk factor corresponding to the first connection having the predefined relationship with the risk threshold; and the additional recommended pathway and additional explanation data explaining reasoning for recommending the additional recommended pathway.

9. The system of claim 1, wherein the control circuit, in automatically simulating the plurality of potential pathways, is configured to:

identify, based on the simulation, a first risk factor corresponding to a first connection along a first pipeline pathway;

identify that the first risk factor has a predefined relationship with a risk threshold;

identify a second gaseous resource provider that is different than the first gaseous resource provider based on the first risk factor having the predefined relationship with the risk threshold; and automatically simulate multiple additional potential pathways of the gas pipeline network between the second gaseous resource provider to the destination location to meet the request;

wherein the pathway recommendation comprises a listing of two or more different potential pathways comprising:

the first recommended pathway along with first explanation data explaining reasoning for recommending the first recommended pathway and comprising a notification of the first risk factor corresponding to the first connection having the predefined relationship with the risk threshold; and a first additional recommended pathway, of the multiple additional potential pathways, and additional explanation data explaining reasoning for recommending the first additional recommended pathway comprising a notification of avoiding the first connection.

10. A method for physical pipeline analysis and control of gaseous resource scheduling comprising:

receiving, by a server or computer-based computing system communicatively coupled via a distributed communications network and executing a scheduling application stored on a non-transitory storage medium, a user input corresponding to a request for a gaseous resource to be distributed through a gas pipeline network to a destination location at a destination time, wherein the gas pipeline network comprises a network of physical pipes and connections, usage of which is controlled by third-party entities and costs associated with distribution of the gaseous resource vary according to a plurality of factors;

automatically obtaining, over the distributed communications network, data from a plurality of data sources, the plurality of data sources including data sources provided by the third-party entities, market sources, and environmental sources;

automatically simulating a plurality of potential pathways of the gas pipeline network between a first gaseous resource provider to the destination location to meet the request;

automatically outputting a pathway recommendation comprising at least a first recommended pathway of the gas pipeline network to meet the request and associated financial costs;

receiving a user selection of a selected recommended pathway from the pathway recommendation;

automatically formatting a nomination for the selected recommended pathway including all formal requirements of each of one or more of the third-party entities each controlling a portion of the gas pipeline network establishing the selected recommended pathway; and automatically accessing, via the distributed communications network, and controlling a separate electronic submission system and electronically submitting the nomination for the request for the gaseous resource to the electronic submission system for execution.

11. The method of claim 10, further comprising:

receiving in response to outputting the pathway recommendation, a modified value of a first parameter of a plurality of parameters applied during the initial simulation;

automatically simulating at least one revised recommended pathway of the gas pipeline network between the first gaseous resource provider to the destination location to meet the request that applies the modified value of the first parameter; and automatically outputting the at least one revised recommended pathway and revised associated financial costs based on the plurality of potential pathways and the revised recommended pathway.

12. The method of claim 10, further comprising:

automatically identifying the plurality of potential pathways comprising:

accessing an intended quantity of the gaseous resource to be acquired from the first gaseous resource provider;

identifying a first connection of a first potential pathway, and a first pipeline section directly, fluidly coupled with the first connection;

confirming a first destination capacity of the first pipeline section relative to the intended quantity; and repeatedly identifying one or more additional connections each fluidly coupled with a respective additional pipeline section of the first potential pathway that each have respective destination capacities equal to or greater than the intended quantity;

wherein the first potential pathway comprises the first connection and the first pipeline section, and each of the one or more additional connections and the respective additional pipeline sections.

13. The method of claim 10, further comprising:

generating the pathway recommendation comprising incorporating a listing of multiple different potential pathways comprising:

the first recommended pathway along with first explanation data explaining reasoning for recommending the first recommended pathway and comprising a first pathway score, an estimated first cost and a first set of one or more risk factors, wherein the first pathway score is based on at least the estimated first cost and the first set of one or more risk factors; and a second recommended pathway with second explanation data explaining reasoning for recommending the second recommended pathway and comprising a second pathway score, an estimated second cost and a second set of one or more risk factors, wherein the second pathway score is based on at least the estimated second cost and the second set of one or more risk factors.

14. The method of claim 10, further comprising:

automatically re-accessing, at a later period of time following the formatting of the nomination, at least one of the plurality of data sources, and obtaining real-time current data, from the at least one of the plurality of data sources, corresponding to the selected recommended pathway;

automatically re-simulating two or more of the plurality of potential pathways based on the real-time current data; and automatically outputting an updated recommendation comprising an updated recommended pathway of the gas pipeline network to meet the request and associated financial costs based on the re-simulation.

15. The method of claim 10, further comprising:

automatically accessing, via the distributed communications network and following delivery of the gaseous resource via the selected recommended pathway, quantity delivery information from one or more of the third-party entities controlling at least one pipeline section of the selected recommended pathway, wherein the quantity delivery information specifies a quantity of the gaseous resource intended to be supplied through the respective pipeline section;

automatically accessing, via the distributed communications network, recipient accounting data from an intended recipient of the request comprising a determined delivered quantity of the gaseous resource received by the intended recipient;

automatically accessing the costs associated with distribution of the gaseous resource of the nomination;

automatically reconciling the nomination comprising determining when there are one or more variations between the nomination and each of the quantity delivery information, the determined delivered quantity of the gaseous resource, and the accessed costs associated with distribution of the gaseous resource of the nomination; and controlling a user computing system in rendering on a display a graphical user interface comprising the one or more variations between the nomination and each of the quantity delivery information, the determined delivered quantity of the gaseous resource, and the accessed costs associated with distribution of the gaseous resource of the nomination.

16. The method of claim 10, further comprising:

controlling a user computing system to render a graphical user interface that comprises the pathway recommendation comprising a listing of the first recommended pathway and an additional recommended pathway, and render in association with the first recommended pathway the associated financial costs corresponding to two or more pipeline sections of the first recommended pathway each operated by a different one of the third-party entities, and associated alternate financial costs corresponding to two or more pipeline sections of the additional recommended pathway each operated by a different one of the third-party entities.

17. The method of claim 16, further comprising:

identifying, based on the simulation, a first risk factor corresponding to a first connection along a first pipeline pathway; and identifying that the first risk factor has a predefined relationship with a risk threshold;

wherein the generating the pathway recommendation comprises generating a listing of two or more different potential pathways comprising:

the first recommended pathway along with first explanation data explaining reasoning for recommending the first recommended pathway and comprising a notification of the first risk factor corresponding to the first connection having the predefined relationship with the risk threshold; and the additional recommended pathway, and additional explanation data explaining reasoning for recommending the additional recommended pathway.

18. The method of claim 10, wherein the automatically simulating the plurality of potential pathways, comprises:

identifying, based on the simulation, a first risk factor corresponding to a first connection along a first pipeline pathway;

identifying that the first risk factor has a predefined relationship with a risk threshold;

identifying a second gaseous resource provider that is different than the first gaseous resource provider based on the first risk factor having the predefined relationship with the risk threshold; and automatically simulating multiple additional potential pathways of the gas pipeline network between the second gaseous resource provider to the destination location to meet the request;

wherein the pathway recommendation comprises a listing of two or more different potential pathways comprising:

the first recommended pathway along with first explanation data explaining reasoning for recommending the first recommended pathway and comprising a notification of the first risk factor corresponding to the first connection having the predefined relationship with the risk threshold; and a first additional recommended pathway, of the multiple additional potential pathways, and additional explanation data explaining reasoning for recommending the first additional recommended pathway comprising a notification of avoiding the first connection.

19. A system for scheduling gaseous resources over a physical gas pipeline network comprising:

a control circuit; and an application stored on a non-transitory storage medium and executable by the control circuit, wherein when executed, the application is configured to:

receive a user input corresponding to a request for a gaseous resource to be distributed through the physical gas pipeline network to a destination location at a destination time, wherein the gas pipeline network comprises a network of physical pipes and connections, usage of which is controlled by third-party entities and costs associated with distribution of the gaseous resource vary according to a plurality of factors;

automatically obtain, over a distributed communications network, data from a plurality of data sources, the plurality of data sources including data sources provided by the third-party entities, market sources, and environmental sources;

automatically simulate a plurality of potential pathways of the gas pipeline network between a first gaseous resource provider to the destination location to meet the request;

automatically output a pathway recommendation comprising at least a first recommended pathway of the gas pipeline network to meet the request and associated financial costs;

receive a user selection of a selected recommended pathway from the pathway recommendation;

automatically format a nomination for the selected recommended pathway including all formal requirements of each of one or more of the third-party entities each controlling a portion of the gas pipeline network establishing the selected recommended pathway; and automatically access, via the distributed communications network, and control a separate electronic submission system and electronically submit the nomination for the request for the gaseous resource to the electronic submission system for execution.

20. The system of claim 19, wherein the control circuit when executing the application is further configured to:

automatically identify the plurality of potential pathways comprising:

obtain an intended quantity of the gaseous resource to be acquired from the first gaseous resource provider;

identify a first connection of a first potential pathway, and a first pipeline section directly, fluidly coupled with the first connection;

confirm a first destination capacity of the first pipeline section relative to the intended quantity; and repeatedly identify one or more additional connections each fluidly coupled with a respective additional pipeline section of the first potential pathway that each have respective destination capacities equal to or greater than the intended quantity;

wherein the first potential pathway comprises the first connection and the first pipeline section, and each of the one or more additional connections and the respective additional pipeline sections;

identify, based on the simulation, a first risk factor, of the first set of one or more risk factors, corresponding to a first connection along a first pipeline pathway; and identify that the first risk factor has a predefined relationship with a risk threshold;

wherein the control circuit is further configured to generate the pathway recommendation that incorporates a listing of multiple different potential pathways comprising:

the first recommended pathway along with first explanation data explaining reasoning for recommending the first recommended pathway and comprising a first pathway score, an estimated first cost and a first set of one or more risk factors and comprising a notification of the first risk factor corresponding to the first connection having the predefined relationship with the risk threshold, wherein the first pathway score is based on at least the estimated first cost and the first set of one or more risk factors; and a second recommended pathway with second explanation data explaining reasoning for recommending the second recommended pathway and comprising a second pathway score, an estimated second cost and a second set of one or more risk factors, wherein the second pathway score is based on at least the estimated second cost and the second set of one or more risk factors;

wherein the control circuit when executing the application is further configured to:

control a user computing system to render on a display a graphical user interface that comprises the pathway recommendation comprising the listing of the first recommended pathway and the second recommended pathway, and render in association with the first recommended pathway the associated financial costs corresponding to two or more pipeline sections of the first recommended pathway each operated by a different one of the third-party entities, and associated set of second financial costs corresponding to two or more pipeline sections of the second recommended pathway each operated by a different one of the third-party entities.

* * * * *